(12) United States Patent
Chui et al.

(10) Patent No.: US 7,570,832 B2
(45) Date of Patent: Aug. 4, 2009

(54) IMAGE CLEAN-UP AND PRE-CODING

(75) Inventors: Charles Chui, Menlo Park, CA (US);
Jianzhong Wang, The Woodlands, TX (US)

(73) Assignee: Precoad Inc., Menlo Park, CA (US)

( * ) Notice: Subject to any disclaimer, the term of this patent is extended or adjusted under 35 U.S.C. 154(b) by 431 days.

(21) Appl. No.: 11/153,461

(22) Filed: Jun. 14, 2005

(65) Prior Publication Data
US 2005/0276504 A1   Dec. 15, 2005

Related U.S. Application Data

(60) Provisional application No. 60/579,840, filed on Jun. 14, 2004.

(51) Int. Cl.
*G06K 9/40* (2006.01)
*H04N 5/00* (2006.01)

(52) U.S. Cl. ....................... 382/260; 348/606

(58) Field of Classification Search ............... 382/264, 382/205, 254–263, 265–275; 348/597, 606–625, 348/631
See application file for complete search history.

(56) References Cited

U.S. PATENT DOCUMENTS 5,819,035 A * 10/1998 Devaney et al. ............. 709/202

6,731,821 B1 * 5/2004 Maurer et al. .............. 382/263
7,352,911 B2 * 4/2008 Maurer ....................... 382/260

OTHER PUBLICATIONS

Perona, Pietro & Malik, Jitendra; Scale-Space and Edge Detection Using Anisotropic Diffusion, Jul. 1990, IEEE, IEEE Transations on Pattern Analysis and Machine Intelligence vol. 12, No. 7, 629-639.*
Alvarez, L., et al., "Axioms and Fundamental Equations of Image Processing," Arch. Rational Mech. Anal., vol. 123 (1993), pp. 199-254.
Alvarez, L., et al., "Signal and Image Restoration Using Shock Filters and Anisotropic Diffusion," SIAM J. Numer. Anal., vol. 31, No. 2 (1994), pp. 590-605.
Alvarez, L., et al., "Image Selective Smoothing and Edge Detection by Nonlinear Diffusion, II," SIAM J. Numer. Anal., vol. 29, No. 3 (1992), pp. 845-866.
Black, M., et al., "Robust Anisotropic Diffusion," IEEE Trans. on Image Processing, vol. 7, No. 3 (1998), pp. 421-432.

(Continued)

*Primary Examiner*—Aaron W Carter
(74) *Attorney, Agent, or Firm*—Morgan, Lewis & Bockius LLP

(57) ABSTRACT

A method of filtering a digital image is described. A filter kernel is applied to a respective pixel in a set of pixels to smooth noise and preserve spatial frequencies associated with image edges in the digital image in accordance with a first filtering parameter. The filter kernel is a function of the respective pixel and has a closed form for the respective pixel. The filter kernel includes contributions from a first set of neighboring pixels and has a content-dependent normalization such that a sum of elements in the filter kernel equals a substantially fixed value.

27 Claims, 18 Drawing Sheets

OTHER PUBLICATIONS

Catte, F., et al., "Image Selective Smoothing and Edge Detection by Nonlinear Diffusion," SIAM J. Numer. Anal., vol. 29, No. 1 (1992), pp. 182-193.

Chan, T.F., et al., "On the Convergence of the Lagged Diffusivity Fixed Point Method in Total Variation Image Restoration," SIAM J. Numer. Anal., vol. 36, No. 2 (1999), pp. 354-367.

Chan, T.F., et al., "The Digital TV Filer and Nonlinear Denoising," IEEE Trans. on Image Processing, vol. 10, No. 2, (2001), pp. 231-241.

Demoulini, S., "Variational Methods for Young Measure Solutions of Nonlinear Parabolic Evolutions of Forward-Backward Type and of High Spatial Order," Appl. Anal., vol. 63 (1996), pp. 363-373.

Demoulini, S., "Young Measure Solutions for a Nonlinear Parabolic Equation of Forward-Backward Type," SIAM J. Math. Anal., vol. 27, No. 2 (1996); pp. 376-403.

German, S., et al., "Stochastic Relaxation, Gibbs, Distributions, and the Bayesian Restoration of Images," IEEE Trans. Pattern Anal. and Machine Intell., vol. 6 (1984), pp. 721-741.

Hollig, K., "Existence of Infinitely Many Solutions for a Forward Backward Heat Equation," Trans. Amer. Math. Soc., vol. 278, No. 1 (1983), pp. 299-316.

Horstmann, D., et al., "Aggregation Under Local Reinforcement: From Lattice to Continuum," Euro J. of Appl. Math., vol. 15 (2004), pp. 545-576.

Kawohl, B., et al., "Maximum and Comparison Principle for One-Dimensional Anisotropic Diffusion," Math. Ann., vol. 311 (1998), pp. 107-123.

Kichenassamy, S., "The Perona-Malik Paradox," SIAM J. Appl. Math., vol. 57, No. 5 (1997), pp. 1328-1342.

Kinderlehrer, D., et al., "Weak Convergence of Integrands and the Young Measure Representation," SIAM J., Math. Anal., vol. 23, No. 1 (1992), pp. 1-19.

Mumford, D., et al., "Optimal Approximations by Piecewise Smooth Functions and Associated Variational Problems," Comm. Pure & Appl. Math., vol. 42 (1989), pp. 577-685.

Perona, P., et al., "Scale-Space and Edge Detection Using Anisotropic Diffusion," IEEE Trans. on Pattern Anal. and Machine Intell., vol. 12, No. 7 (1990), pp. 629-639.

Rudin, L.I., et al., "Nonlinear Total Variation Based Noise Removal Algorithms," Physica D., vol. 60 (1992), pp. 259-268.

Sapiro, G., et al., "Anisotropic Diffusion of Multivalued Images with Applications to Color Filtering," IEEE Trans. on Image Processing, vol. 5, No. 11 (1996), pp. 1582-1586.

Taheri, S., et al., "Young Measure Solutions and Instability of the One-Dimensional Perona-Malik Equation," J. Math. Anal. and Appl., vol. 308 (Feb. 23, 2005), pp. 467-490.

Tang, B., et al., "Color Image Enhancement Via Chronaticity Diffusion," IEEE Trans. on Image Processing, vol. 10, No. 5 (2001), pp. 701-707.

Torkamani-Azar, F., et al., "Image Recovery Using the Anisotropic Diffusion Equation," IEEE Trans. on Image Processing, vol. 5, No. 11 (1996), pp. 1573-1578.

Whitaker, R.T., et al., "A Multi-Scale Approach to Nonuniform Diffusion," CVGIP: Image Understanding, vol. 57, No. 1 (1993), pp. 99-110.

Jingxue, Y., et al., "Young Measure Solutions for a Class of Forward-Backward Diffusion Equations," J. Math. Anal. Appl., vol. 279 (2003).

Search Report for International Application No. PCT/US2005/21099, mailed Aug. 31, 2006.

Liu, C., et al., Robust Coding Schemes for Indexing and Retrieval from Large Face Databases, IEEE, 1057-7149, 2000, pp. 132-137.

Osuna, E., et al., "Training Support Vector Machines: an Application to Face Detection," IEEE, 1063-6919, 1997, pp. 130-136.

* cited by examiner

Input Image -- Unfiltered
1902

Result after Applying CDF
1904

IMAGE CLEAN-UP AND PRE-CODING

CROSS REFERENCE TO RELATED APPLICATIONS

This application claims priority to U.S. provisional application 60/579,840, entitled "Methods and Systems for Image Clean-Up and Pre-coding," filed on Jun. 14, 2004, the contents of which are herewith incorporated by reference.

FIELD OF THE INVENTION

The present invention relates generally to image processing, and more specifically to image and video clean-up and pre-coding.

BACKGROUND

Conventional image noise removal (or reduction) algorithms may be divided into two categories: statistical methods and kernel methods. One statistical method algorithm is median filtering. In median filtering, a value for a respective pixel in a set of (noisy) pixels to be cleaned up in an image is determined as a median pixel value in a specified window centered at the respective pixel. While Median filtering may be effective in removing or reducing impulse noise, it often has difficulty in removing Gaussian (white) noise and may blur the image (i.e., the image may be smoothed). Blurring may be more pronounced when the window is larger, for example, in images with a high percentage of impulse noise.

Another statistical method, order-statistics (OS) filtering may offer a reduced amount or degree of blurring. In OS filtering, the set of pixels in the window are arranged as an ordered sequence and the respective pixel is replaced by a linear combination of this sequence using suitable pre-determined weights. However, the same window (shape and size) and the same weights may be used for each pixel in the image. As a consequence, it is often difficult to preserve or maintain an overall image sharpness.

Kernel methods, such as moving average (MA) filtering, infinite impulse response (IIR) or autoregressive moving average (ARMA) filtering (i.e., MA in conjunction with autoregressive feedback), and convolution filtering, may be more effective in reducing Gaussian noise, but may be less effective in reducing impulse noise. In addition, depending on filter coefficients (also referred to as filter weights), kernel methods may have even more difficulty than the statistical methods in preserving image sharpness.

Conventional image filtering, including the statistical and the kernel methods, often achieve noise reduction by image smoothing, and thus, by sacrificing image sharpness. This may lead to excessive blurring of the image. While there have been attempts to modify these methods to preserve a certain amount of image sharpness (for example, through the use of a convolution mask for each pixel in accordance with an inverse gradient), such approaches entail increased computational cost and complexity, and often use multi-stage processing (i.e., numerous iterations of the image processing) of the image.

Recent advances in image noise removal include the "maximum a posteriori" (MAP) and variational approaches. The MAP approach is statistical (i.e., discrete) in nature. The variational approach is analytical and is often proposed as a minimization problem of an energy functional, which is often defined as a summation of a bending or internal ("a prior") energy functional. While the internal energy functional governs the output image quality, the external energy functional measures the proximity to the input image to be cleaned up. A positive constant is used as a parameter for balancing image (smoothness/sharpness) quality and fidelity of the output "clean" image in comparison with the input noisy image (governed by the external energy). The steepest decent approach to solving the Euler-Lagrange equation of the energy minimization problem gives rise to the (isotropic and anisotropic) diffusion and diffusion-reaction partial differential equations (PDE). While the variational approach and other recent related approaches (such as numerical solutions of an anisotropic diffusion or diffusion-reaction PDE) usually provide an improvement over the conventional algorithms discussed above, the improvement often entails increased computational cost and complexity, and often uses multi-stage processing of the image.

There is a need, therefore, for an improved image processing approach that removes or reduces noise in an image while substantially preserving image content (such as image texture and image edges). There is also a need for reduced computational cost, reduced complexity and one-pass or a reduced number of stages in processing of images.

SUMMARY

A method of filtering a digital image is described. A filter kernel is applied to a respective pixel in a set of pixels to smooth noise and preserve spatial frequencies associated with image edges in the digital image in accordance with a first filtering parameter. The filter kernel is a function of the respective pixel and has a closed form for the respective pixel. The filter kernel includes contributions from a first set of neighboring pixels and has a content-dependent normalization such that a sum of elements in the filter kernel equals a substantially fixed value. Alternately stated, the sum of elements equals or approximately equals a fixed value.

The applying may include a single pass for the respective pixel. The applying may be performed for each pixel in the set of pixels to produce a filtered digital image. Applying the filter kernel to each pixel in the set of pixels one or more additional times may leave the filtered digital image substantially unchanged.

The first filtering parameter may determine a boundary between smoothing and sharpening. The first filtering parameter may substantially maintain texture information in the digital image by reducing smoothing of noise at a position in the digital image containing spatial frequencies greater than a threshold.

Non-central elements in the filter kernel may include magnitudes of differences between pixels in the first set of neighboring pixels and a respective pixel in a discretization of an anisotropic diffusion equation. A central pixel in the filter kernel may correspond to the respective pixel. The first filtering parameter may map a time step in the discretization of the anisotropic diffusion equation to a content-dependent scale. A conductivity in the discretization of the anisotropic diffusion equation may be a function of a wavelet transformation. The discrete conductivity elements from the conductivity function may be implemented as a look-up table.

The filter kernel may correspond to a window of size $2m+1$ by $2n+1$ and may include the first set of neighboring pixels. m and n for the filter kernel may be a function of a pixel size. m may be equal to n.

In some embodiments, the method may further include modifying a color or color component of the pixel using a filter kernel.

In some embodiments, the filter kernel includes contributions from a second set of neighboring pixels and is further in accordance with a second filtering parameter.

In an alternate embodiment of a method of filtering a digital image, the filter kernel is applied to the respective pixel in the set of pixels to smooth noise and preserve spatial frequencies associated with image edges in the digital image in accordance with the filtering parameter. The filtered pixel corresponds to $$\sum_{m,n} \frac{1}{\gamma} M \otimes U,$$

where M is a closed-form array that is a function of the respective pixel and has a window size of 2 m+1 by 2n+1 (m and n are positive integers), M includes contributions from a 2 m+1-by-2n+1 set of neighboring pixels, U is a sub-array in the set of pixels and includes the respective pixel and the set of neighboring pixels, $\otimes$ indicates element-by-element multiplication of elements in M and elements in U, and $\gamma$ is a time to content-dependent scale, resulting in normalization of the filter kernel M such that a sum of elements in $$\frac{1}{\gamma} M$$

equals or approximately equals a fixed value.

The method of, and related apparatus for, filtering the digital image offer reduced noise while substantially preserving image content. The method and related apparatus also offer reduced computational cost, reduced complexity and one-pass or a reduced number of stages in processing of the digital image.

BRIEF DESCRIPTION OF THE DRAWINGS

For a better understanding of the invention, reference should be made to the following detailed description taken in conjunction with the accompanying drawings, in which.

Like reference numerals refer to corresponding parts throughout the drawings.

DETAILED DESCRIPTION OF EMBODIMENTS

Figure 1:
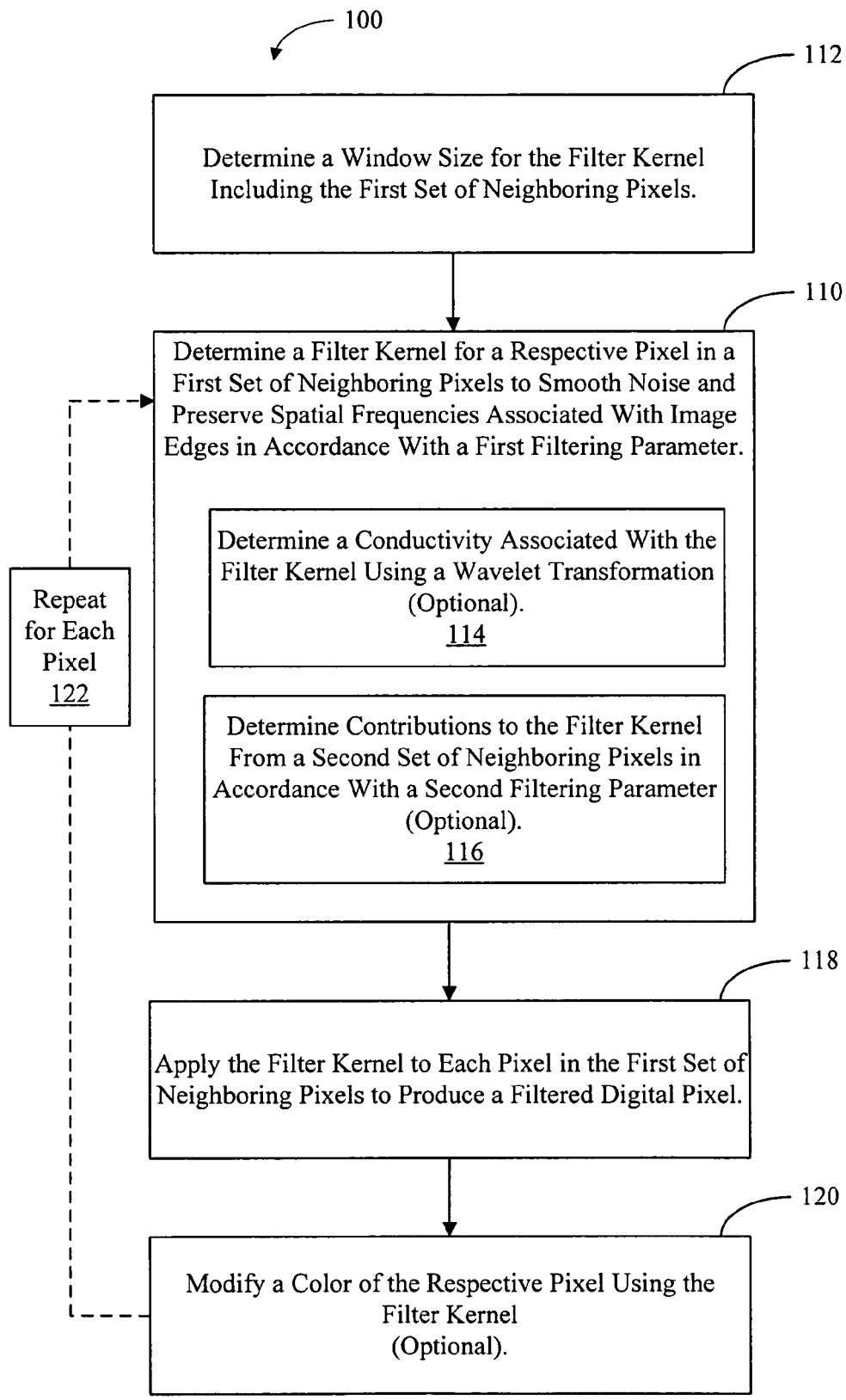
FIG. 1 is a flow diagram illustrating an embodiment of a process of filtering a digital image.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, and circuits have not been described in detail so as not to unnecessarily obscure aspects of the embodiments.

An image processing method, and related apparatus and systems, are described. The image processing is centered on a computationally efficient filter kernel that may improve image quality (for example, reduce or remove noise), reduce a communication bandwidth and/or reduce storage size of a digital image or a set of digital images (such as video) while preserving and/or enhancing image content. The filter kernel may be included as a pre-filter or pre-coder in an image or video compression system that uses an image or video compression methodology such as JPEG, JPEG-2000, MPEG, H263, or H264. In video compression applications, the filter kernel may be used to pre-filter I frames, P frames, B frames and/or macro-blocks, as well as in 3-dimensional pre-filtering of so-called motion compensated image cubes. The filter kernel may be used in scanners, printers, digital cameras (in cellular telephones, in other portable devices, and/or in stand-alone cameras) and camcorders, as well as in post-processing of images. The filter kernel may be implemented in software and/or hardware, such as an application specific integrated circuit (ASIC), a field programmable gate array (FPGA), a digital signal processor (DSP) or other integrated circuit. In some embodiments, the filter kernel may have a closed form. The filter kernel may be applied in one-pass to a set of pixels corresponding to a respective image to produce a filtered image. Subsequent applications of the filter kernel to the filtered image may leave the filtered image substantially unchanged. For example, changes in a magnitude at one or more spatial frequencies may be less than 5 to 10% of a pre-filtered value. If the filter kernel is applied more than once, one or more smoothness/sharpness parameter(s) associated with the filter kernel may be unchanged or may be modified.

The filter kernel is non-linear and content-dependent (henceforth referred to as a content-dependent filter or CDF). For a respective set of pixels in the image, a 2-dimensional CDF corresponds to a window or filter size of 2 m+1 by 2n+1 (for arbitrary positive integers m and n). The CDF is based on an anisotropic diffusion model and/or an anisotropic diffusion-reaction model. A gradient operation in a conductivity term in the anisotropic diffusion model may be replaced by a wavelet transformation in the horizontal and/or vertical directions. Rather than computing a numerical solution to a resulting partial differential equation (PDE), which requires numerous iterative steps, one or more time-to-scale transformations are introduced. These transformations map a constant time-step parameter in a discretization of the PDE to one or more content-dependent scales that, in general, vary for each pixel in the image or a subset of the image. The mapping is in accordance with differences between a central pixel in the window and respective pixels in one or more sets of neighboring pixels in the window and/or by a wavelet transformation. In general, therefore, the resulting CDF varies for each pixel to be process, i.e., filter coefficients or filter weights vary for different pixel values (or, more generally, with local image content). The CDF, however, may have a closed form. As such, the image processing of each pixel may be performed in a single operation, i.e., the CDF may be a one-pass filter. In some embodiments, the CDF may be implemented in several passes, but with fewer operations or stages than conventional image filters (which may use up to 100 operations or stages).

The time-to-scale transformations (also called time-to-scale mappings) during construction of the CDF may take different forms depending on a desired window size of the CDF. The window size may be in accordance with a pixel size in the image and/or an image resolution. For example, for small pixel sizes (high resolution) noise in the image may extend over several pixels. As a consequence, a larger window may be used in such circumstances. The description below of derivations for several filter window sizes (including a 3×3 window) may be extended to arbitrary window size, as well as to filters with 3-dimensional windows for removing or reducing image noise in 3-dimensional images. As such, the derivations are considered illustrative of a general approach. The time-to-scale transformations may include at least one parameter that may be used to adjust a smoothness/sharpness for the image. At least the one parameter may be pre-defined or may be adjusted, automatically and/or manually. The adjusting may be in accordance with lighting intensity, shutter speed and/or image content in the image. At least the one parameter may maintain texture information in the image by reducing a smoothing of noise at a position in the image containing spatial frequencies greater than a threshold.

Attention is now directed towards embodiments of a process for filtering a digital image and the related apparatus and systems. FIG. 1 is a flow diagram illustrating an embodiment 100 of a process of filtering a digital image. A window size for the filter kernel, including the first set of neighboring pixels is determined (112) for the filtering process. A filter kernel, such as a filter kernel for a CDF, is determined or constructed for a respective pixel in a first set of neighboring pixels (110). The filter kernel smoothes noise and preserves spatial frequencies associated with image edges in accordance with a first filtering parameter. A conductivity associated with the filter kernel is determined using an optional wavelet transformation (114).

Contributions to the filter kernel from a second set of neighboring pixels may be optionally determined in accordance with a second filtering parameter (116). The filter kernel is applied to each pixel (including the center pixel) in the first set of neighboring pixels to produce a filtered digital pixel (118). A color of the respective pixel is optionally modified using a corresponding filter kernel (120). The process may be repeated one or more times (122) for additional pixels in the set of pixels. The process may be repeated one or more times for one or more color channels. The respective color channels may be RGB, Y Cb Cr, YUV, or YIQ color channels. The process 100 may be repeated a plurality of times including at least one iteration for at least a subset of pixels in the image. In some embodiment, multiple pixels may be processed in parallel, using parallel processors or circuits. The process 100 may include fewer operations or additional operations. In addition, two or more operations may be combined and/or the order of the operations may be changed.

Figure 2:
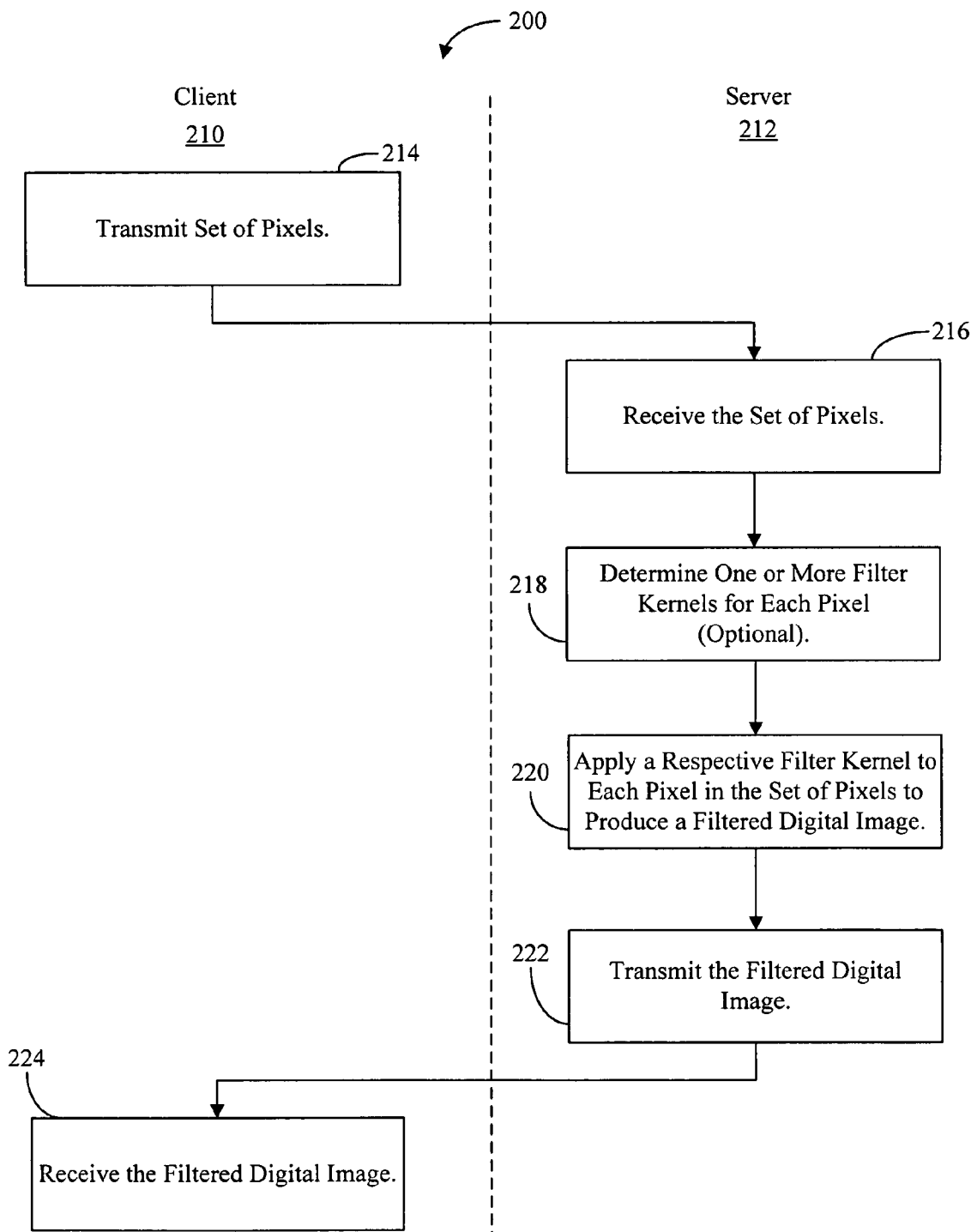
FIG. 2 is a flow diagram illustrating an embodiment of a process of filtering a digital image.

FIG. 2 is a flow diagram illustrating an embodiment of a process 200 of filtering a digital image. A client device 210 (e.g., a device that includes an image sensor) transmits a set of pixels (214) to a server device (e.g., a device that includes a processor, DSP, or ASIC) 212. The set of pixels are received (216). One or more filter kernels are optionally determined or constructed for each pixel in the set of pixels (218). A respective filter kernel is applied to each pixel in the set of pixels to produce a filtered digital image (220). The filtered digital image is transmitted (222) to the client device 210. The filtered digital image is received (224). The process 200 may include fewer operations or additional operations. In addition, two or more operations may be combined and/or the order of the operations may be changed.

Figure 3:
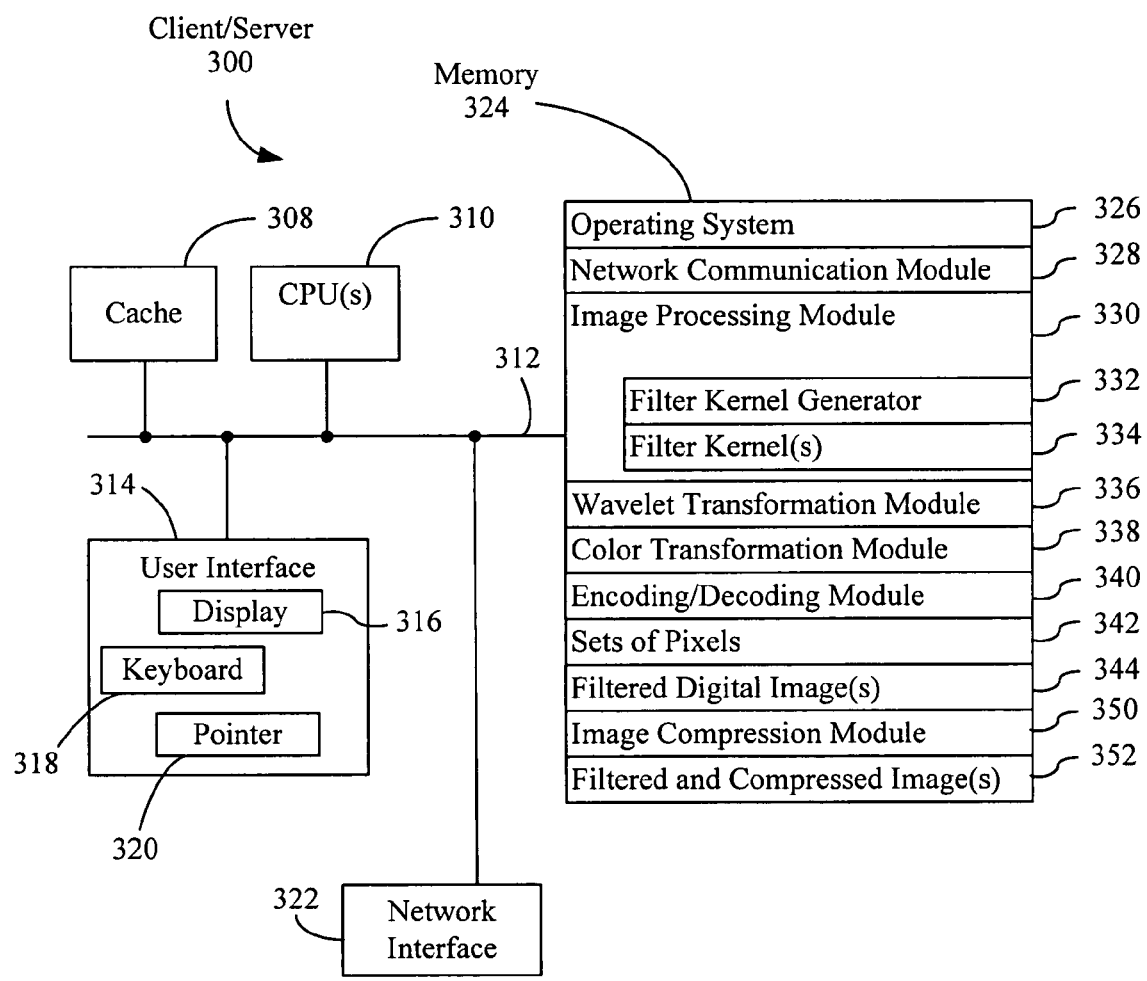
FIG. 3 is a block diagram illustrating an embodiment of a client or a server.

FIG. 3 is a block diagram illustrating an embodiment of a client computer, client device or a server device (e.g., a device that includes a processor, DSP, or ASIC) 300. The client computer, client device or server device 300 may include at least one data processor, video processor and/or central processing unit (CPU) 310, one or more optional user interfaces 314, a communications or network interface 322 for communicating with other computers, servers and/or devices 400 (FIG. 4), memory 324 and one or more communication busses or signal lines 312 for coupling these components to one another. The at least one data processor, video processor and/or central processing unit (CPU) 310 may support multi-threaded and/or parallel processing. The user interface 314 may have one or more displays 316, keyboards 318 and/or pointers 320 (such as a mouse). The client or server device 300 may include one or more cache memories 308, which may be used as a rolling cache for at least a subset of the set of pixels.

Memory 324 may include high-speed random access memory and/or non-volatile memory, including ROM, RAM, EPROM, EEPROM, one or more flash disc drives, one or more optical disc drives and/or one or more magnetic disk storage devices. Memory 324 may store an operating system 326, such as LINUX, UNIX, OS9 or WINDOWS, that includes procedures (or a set of instructions) for handling basic system services and for performing hardware dependent tasks. Memory 324 may also store communication procedures (or a set of instructions) in a network communication module 328. The communication procedures are used for communicating with one or more computers, servers and/or devices 400 (FIG. 4).

Memory 324 may also include the following elements, or a subset or superset of such elements, including image processing module 330 (or a set of instructions), wavelet transformation module 336 (or a set of instructions), color transformation module 338 (or a set of instructions), encoding/decoding module 340 (or a set of instructions), such as JPEG or MPEG, one or more sets of pixels 342 and/or one or more filtered digital images 344. The image processing module 330 may include filter kernel generator 332 and/or one or more filter kernels 334. In some embodiments, memory 324 further includes an image compression module 350, used to compress the filtered digital images 344, using an image or video compression methodology (such as JPEG, JPEG-2000, MPEG, H263, or H264) to produce filtered and compressed images 352.

Although FIG. 3 shows the client or server 300 as a number of discrete items, FIG. 3 is intended more as a functional description of the various features which may be present in the client or server 300 rather than as a structural schematic of the embodiments described herein. In practice, and as recognized by those of ordinary skill in the art, the functions of the client or server 300 may be distributed over a large number of servers or clients, with various groups of the clients or servers performing particular subsets of those functions. Items shown separately in FIG. 3 could be combined, some items could be separated and/or additional items may be included.

Figure 4:
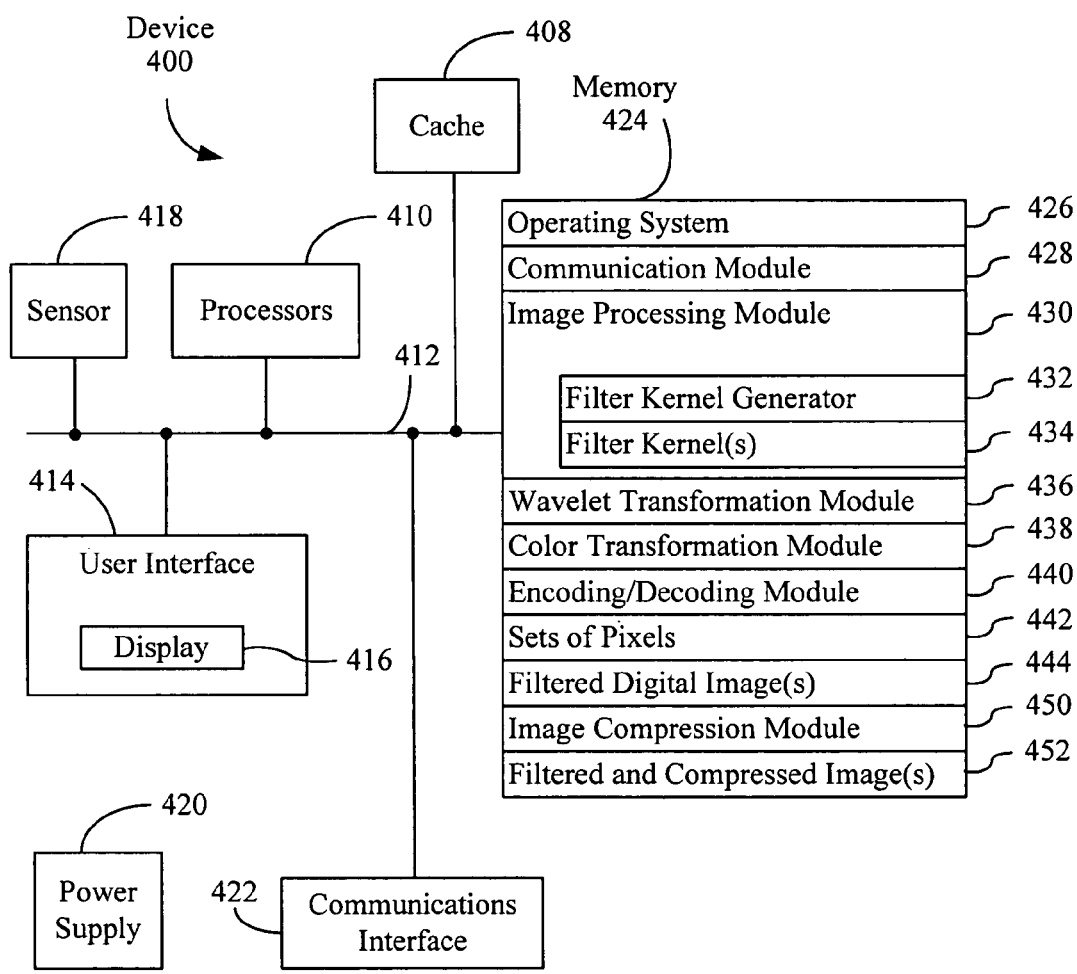
FIG. 4 is a block diagram illustrating an embodiment of a device.

FIG. 4 is a block diagram illustrating an embodiment of a device 400, such as a cell phone that includes a camera, a digital camera or camcorder. The device 400 may include one or more data processors, video processors and/or central processing units (CPU) 410, one or more optional user interfaces 414, one or more image sensors 418, a communications or interface 422 (such as USB) for communicating with other computers, servers and/or devices 400, memory 424 and one or more communications busses or signal lines 412 for coupling these components to one another. The one or more data processors, video processors and/or central processing units (CPU) 410 may support multi-threaded and/or parallel data processing. The user interface 414 may have one or more displays 416 and/or one or more keys or key pads. The device 400 may also include a power supply 420. The device 400 may include one or more cache memories 408, which may be used as a rolling cache for at least a subset of the set of pixels.

Memory 424 may include high-speed random access memory and/or non-volatile memory, including ROM, RAM, EPROM, EEPROM, one or more flash disc drives, one or more optical disc drives and/or one or more magnetic disk storage devices. Memory 424 may store an embedded operating system 426, such as LINUX, OS9, UNIX or WINDOWS or a real-time operating system (e.g., VxWorks by Wind River Systems, Inc.) suitable for use on industrial or commercial devices. The embedded operating system 426 may includes procedures (or a set of instructions) for handling basic system services and for performing hardware dependent tasks. Memory 424 may also store communication procedures (or a set of instructions) in a communication module 428. The communication procedures are used for communicating with one or more computers, servers and/or devices 400.

Memory 424 may also include the following elements, or a subset or superset of such elements, including image processing module 430 (or a set of instructions), wavelet transformation module 436 (or a set of instructions), color transformation module 438 (or a set of instructions), encoding/decoding module 440 (or a set of instructions), such as JPEG or MPEG, one or more sets of pixels 442. The image processing module 430 may include filter kernel generator 432 and/or one or more filter kernels 434. The device 400 may also include one or more filtered digital images 444. The filtered digital images 444 may be stored in the memory 424 or in a separate non-volatile memory, such as flash memory, which may be removable. In some embodiments, memory 424 further includes an image compression module 450, used to compress the filtered digital images 444, using an image or video compression methodology (such as JPEG, JPEG-2000, MPEG, H263, or H264) to produce filtered and compressed images 452.

Although FIG. 4 shows the device 400 as a number of discrete items, FIG. 4 is intended more as a functional description of the various features which may be present in the device 400 rather than as a structural schematic of the embodiments described herein. Items shown separately in FIG. 4 could be combined, some items could be separated and/or additional items may be included.

Figure 5:
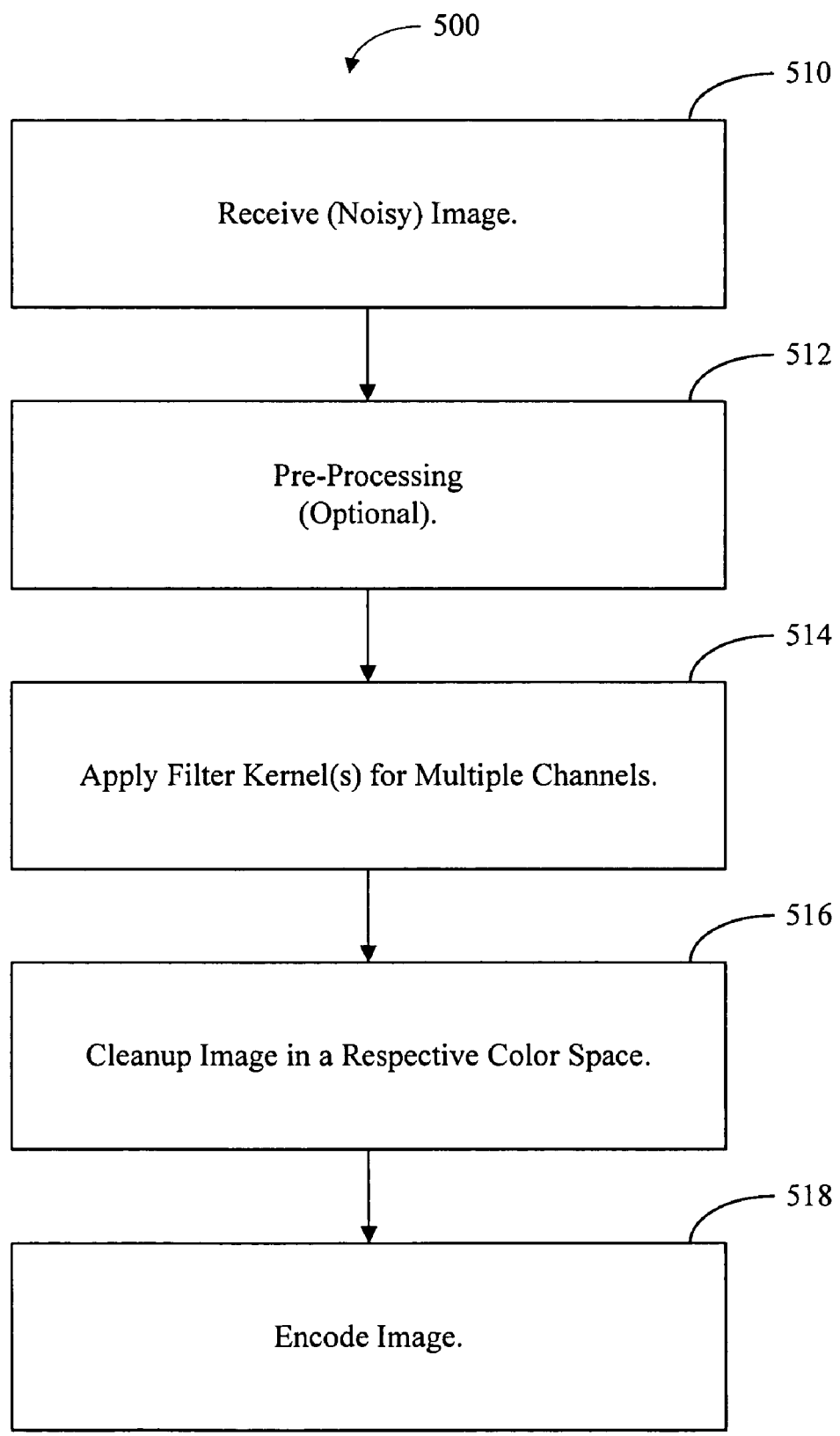
FIG. 5 is a flow diagram illustrating an embodiment of a process of filtering a digital image.

FIG. 5 is a flow diagram illustrating an embodiment 500 of a process of filtering a digital image or video. A noisy image is received (510). The image is optionally pre-processed (512), including analog-to-digital conversion (if necessary) and/or a color transformation. One or more filter kernels are applied to multiple channels (514). An image in a respective color space is cleaned up (516). The image is encoded (518), for example, using JPEG or MPEG compression. The flow diagram 500 may include fewer operations or additional operations. In addition, two or more operations may be combined and/or the order of the operations may be changed.

Attention is now directed towards the filter kernel for the CDF. As discussed previously, conventional image processing for noise removal or reduction include MAP and variational approaches. Approaches based on the anisotropic diffusion PDE, as well as the anisotropic diffusion-reaction PDE, are used for the variational approach. Here an energy functional is minimized, so that the corresponding conductivity function c of the diffusion model is not constant, resulting in a non-linear PDE. In general, such non-linear PDEs are solved numerically using an iterative process.

Figure 6:
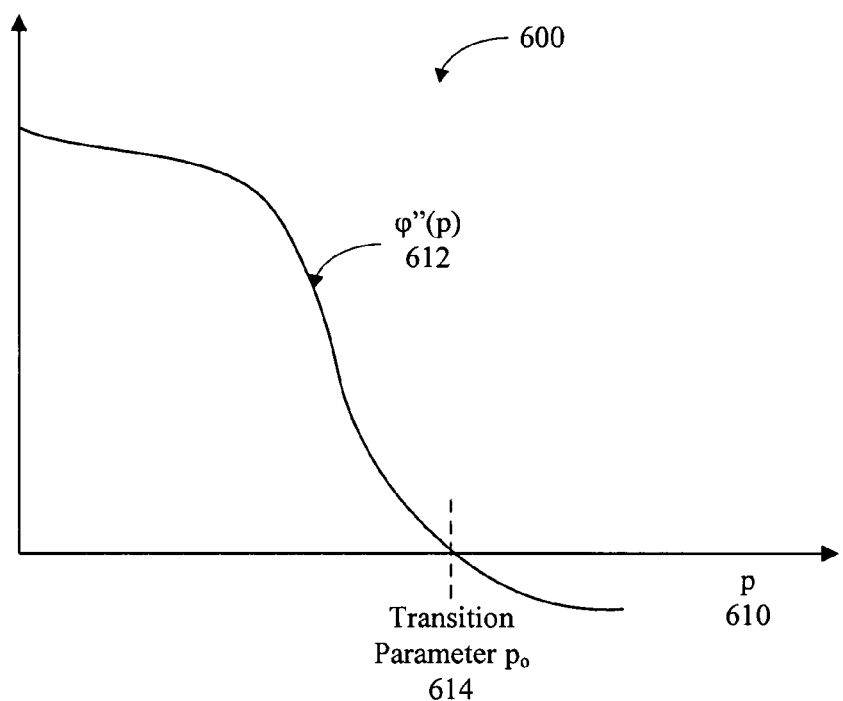
FIG. 6 is a block diagram illustrating a transition parameter.

Some conventional approaches extend the approaches based on the anisotropic diffusion PDE by defining the conductivity c as a function, $c(p)=\phi'(p)/p$, corresponding to a differentiable non-decreasing function $\phi(p)$ with $\phi(0)=0$. (If $\phi(p)$ is an internal energy density function of an internal energy functional, a steepest decent approach to solving the Euler-Lagrange equation in a minimum-energy problem results in the anisotropic diffusion PDE for a discrete formulation of the external energy and the diffusion-reaction PDE for a continuous formulation of the external energy). Function $\phi''(p)$ 612 (where the double quote mark " denotes a second derivative) as a function of p 610 is illustrated in FIG. 6, with $p=|\nabla u|$, the magnitude of a spatial gradient of u, which is a (unknown) solution to the anisotropic diffusion equation at a time instant. One popular choice for the internal energy density function is $\phi(p)=p$. For this choice the corresponding conductivity function $c(p)=1/p$. Small values of p 610 correspond to fast diffusion of the image content. As consequence, image details such as image texture and light image edges may be lost during the image processing. Large values of p 610 correspond to sharpening of edges in the image content. While there is a continuous variation between these extremes, a zero crossing, referred to as a transition parameter $p_o$ 614, separates the two regimes.

Figure 7:
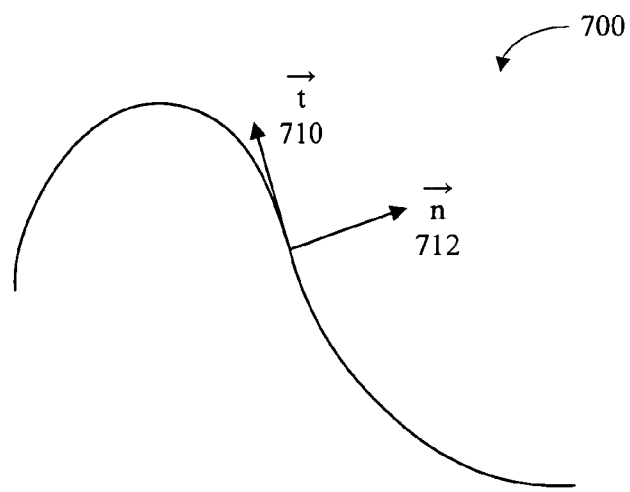
FIG. 7 is a block diagram illustrating local coordinates at a point on an image edge.

FIG. 7 is a block diagram illustrating local coordinates 700, including a transverse unit vector t 710 and a normal unit vector n 712, at a point on an image edge. When $p=|\nabla u|$ (FIG. 6) is larger than the transition parameter $p_o$ 614, sharpening occurs due to backward diffusion along the normal unit vector n 712. Note that the normal unit vector n 712 is a unit vector in the direction of the gradient of the (unknown) solution u, and the transverse unit vector t 710 is orthogonal to n using the right-hand rule. When the $p=|\nabla u|$ (FIG. 6) is smaller than the transition parameter $p_o$ 614 (FIG. 6), minimal diffusion occurs along the normal unit vector n 712 and hence blurring is less visible. For a suitable choice of the transition parameter $p_o$ 614, image sharpness may be maintained or enhanced while image noise is removed or reduced. As discussed previously, however, these and other models based on the anisotropic diffusion PDE have increased complexity and an increased amount of computation used to find numerical solutions. Typically, these and other solutions of the non-linear anisotropic diffusion PDE use numerous iterations or multi-stage image processing. For example, the PDE may be discretized using a constant time-step parameter $\Delta t$ to formulate non-linear difference equations. A noisy input image is used as an initial condition of the PDE. Numerical solutions, corresponding to a "clean" output image, typically involve numerous iterative steps or operations (up to 100 or more) and also depend on an ad hoc choice of a stop-time for terminating the iterative process.

In the derivation of a CDF described below, the anisotropic diffusion PDE is discretized. In other embodiments, related non-linear PDEs, such as the diffusion-reaction PDE, may be discretized. The noisy image is used as the initial condition. The conductivity function $c(p)$ is defined as a function of $p=|\nabla u|$. In exemplary embodiments, the conductivity function may be $$c(p) = e^{\frac{-p^2}{2p_o^2}},$$

$$c(p) = \frac{p_o^2}{p_o^2 + p^2},$$

or $$c(p) = \min\left(1, \frac{1}{p}\right).$$

Instead of solving the PDE numerically, the time parameter is mapped to a pixel-dependent scale. This scale may eliminates the use of the stop-time and may allow image processing to be implemented in one-pass. As an illustrative embodiment, a 3×3 filter window is considered. Results for 3×5, 5×5 and 7×7 filter windows are also shown. As will be clear to those skilled in the art, CDFs with larger filter sizes, as well as 3-dimensional CDFs, may also be constructed.

The CDF, derived below, has a finite filter length in both horizontal and vertical directions (3-dimensional embodiments of the CDF also have a finite length in a third direction). Each pixel in at least a subset of the image that is filtered may have its own CDF filter. In some embodiments, theses CDF filters correspond to a window having a symmetric shape in the horizontal and vertical directions. The window may correspond to 2 m+1 by 2n+1 pixels, where m and n are arbitrary positive integers (for 3-dimensional embodiments, a dimension in the third direction is q). In an exemplary embodiment m and n are each positive integers between 1 and 50 (and for 3-dimensional embodiments, q may be a positive integer between 1 and 10). In some embodiments, m may be equal to n, i.e., the window may be square. In some embodiments, the window may rectangular. In some embodiments, the window may have an asymmetric shape, such as an even-by-odd number of pixels or an odd-by-even number of pixels. The CDF incorporates several additional features than in the formalism described above. In the process, the image processing may be implemented in a single pass, i.e., in a non-iterative fashion.

In order for the CDF to be more effective, in some embodiments entries in the window may not have arbitrary zero filter coefficients or weights. For example, when designing a 3×3 filter, corner entries in a filter matrix $F_{ij}^k$ are determined according to the conductivity functions of the anisotropic diffusion model. Thus, in some embodiments all of geographic directions with respect to the center pixel in the window are discretized in accordance with the size of the window, thereby determining entries for all the elements in the window.

The use of a conductivity function $c(|\nabla u|)$ that is a function of the magnitude of the spatial gradient of the unknown solution u may pose challenges. In particular, since the unknown solution u is used to initially represent the input image data, it may be contaminated with noise and the spatial gradient values of u may be inexact and may exhibit strong fluctuations. To address this, the spatial gradient of the input image in the discrete conductivity functions may be replaced by a wavelet transform of the input image in the horizontal and/or vertical directions. In an alternative embodiment, the spatial gradient of the input image in the conductivity functions may be modified such that a Gaussian convolution is performed on the (unknown) solution u before the gradient operation is applied. While the CDF may be applied in one-pass, if the CDF is applied more than once subsequent iterations may or may not use the modified version of the conductivity function $c(|\nabla u|)$ described above, since the filtered image may no longer be noisy.

In addition, time-to-scale transformations (also referred to as time-to-scale mappings) are introduced. These transformations map the constant time-step parameter $\Delta t$ (henceforth denoted by $\lambda$) in the discretization of the anisotropic diffusion PDE to one or more pixel-dependent scales. These scales are formulated as functions of the center pixel in the input noisy image, as well as its neighboring pixels in the filter window. As described further below, the time-to-scale transformations are associated with one or more parameters that determine an image smoothness/sharpness adjustment. The one or more parameters may be used to produce a pleasing blur effect while keeping the sharpness of certain distinct image edges substantially intact. The use of the time-to-scale transformation allows construction of the filter kernel for the CDF without numerically solving the anisotropic diffusion or other PDEs. As a consequence, when applying the CDF to remove or reduce noise from an image, the iterative steps and a stop-time k may not be needed.

After discretization, the anisotropic diffusion PDE may be expressed as $$u_{ij}^{k+1} = u_{ij}^k + \frac{\Delta t}{h^2}[C_E^k \partial_E + C_S^k \partial_S + C_W^k \partial_W + C_N^k \partial_N]u_{ij}^k,$$

where $u_{ij}^o$ denotes the $(i,j)^{th}$ pixel of the input image, and $u_{ij}^k$ denotes the solution (at the $(i,j)^{th}$ pixel location) of the difference equation after k iterations (or k iterative time steps), with a constant time-step parameter denoted by $\Delta t$ and adjacent pixel distance denoted by h. $C_E^k$, $C_S^k$, $C_W^k$, and $C_N^k$ denote discretization of the conductivity function $c(|\nabla u|)$ along East (E), South (S), West (W) and North (N) geographic directions or orientations associated with a first set of neighboring pixels. Henceforth, these are referred to as discrete conductivity functions. Since the conductivity function $c(|\nabla u|)$ is a function of the gradient of the unknown solution $u=u(x,y,t)$, with spatial coordinates (x,y) and time variable t, the difference equation is also dependent on the unknown solution and is, therefore, image content-dependent. In the above formulation, $\partial_E$, $\partial_S$, $\partial_W$, and $\partial_N$ denote first-order spatial differences applied to the pixels. In particular, $$\partial_E u_{ij}^k = u_{i+1,j}^k - u_{ij}^k$$

$$\partial_S u_{ij}^k = u_{i,j-1}^k - u_{ij}^k$$

$$\partial_W u_{ij}^k = u_{i-1,j}^k - u_{ij}^k$$

$$\partial_N u_{ij}^k = u_{i,j+1}^k - u_{ij}^k.$$

The difference equation may be re-expressed as $$u_{ij}^{k+1} = \left[1 - \frac{\Delta t}{h^2}(C_E^k + C_S^k + C_W^k + C_N^k)\right]u_{ij}^k +$$
$$\frac{\Delta t}{h^2}C_E^k u_{i+1,j}^k + \frac{\Delta t}{h^2}C_S^k u_{ij-1}^k + \frac{\Delta t}{h^2}C_W^k u_{i-1,j}^k + \frac{\Delta t}{h^2}C_N^k u_{ij+1}^k.$$

This difference equation may, in turn, be re-formulated as an iterative pixel-dependent filtering process, with the filters represented by matrix templates, $$F_{ij}^k = \begin{bmatrix} 0 & \Delta t c_N^k / h^2 & 0 \\ \Delta t c_W^k / h^2 & 1 - \Delta t(c_N^k + c_E^k + c_S^k + c_W^k)/h^2 & \Delta t c_E^k / h^2 \\ 0 & \Delta t c_S^k / h^2 & 0 \end{bmatrix},$$

where the discrete conductivity functions $C_E^k, C_S^k, C_W^k$, and $C_N^k$ are functions of the first set of neighboring pixels as well as a center pixel, i.e., $$u_{ij}^k, u_{i+1,j}^k, u_{i,j-1}^k, u_{i-1,j}^k, u_{i,j+1}^k.$$

$C_E^k, C_S^k, C_W^k, C_N^k$ are, therefore, also dependent on the pixel locations (i,j). For notational simplicity, however, the subscripts i,j are not shown. In existing filtering approaches that are iterative, the iterative filtering process (k=0, 1, 2, . . . ) may be described by component-wise matrix multiplication (also called entry-wise multiplication or element-by-element multiplication) followed by summation of all resulting matrix components or $$u_{i,j}^{k+1} = \sum F_{ij}^k \otimes u_{ij}^k,$$

where $u_{ij}^k$ is the central pixel in the set of pixels corresponding to the filter window after k iterations.

To construct the filter kernel for a CDF with the 3×3 filter window, a second set of neighboring pixels in the North East (NE), South East (SE), South West (SW) and North West (NW) directions are also discretized. The difference equation may be extended to include these 4 additional pixels, $$u_{ij}^{k+1} = u_{ij}^k + \frac{\Delta t}{h^2}[(C_E^k \partial_E + \cdots + C_N^k \partial_N) + \nu(C_{NE}^k \partial_{NE} + \cdots + C_{NW}^k \partial_{NW})]u_{ij}^k$$

where $\nu$ is a parameter that may be adjusted independently or that may be coupled to $\lambda = \Delta t$ such that only one free parameter is used for image smoothness/sharpness adjustment. The difference equation may be changed in the CDF by defining a content-dependent scale value $$k_{ij} = 1 + \frac{\alpha}{h^2}[(C_E^0 + \cdots + C_N^0) + \nu(C_{NE}^0 + \cdots + C_{NW}^0)],$$

where $\alpha$ is a parameter corresponding to the image smoothness/sharpness adjustment, and by introducing the time-to-scale transformation $$\Delta t = \lambda \to \frac{\alpha}{k_{ij}},$$

which maps the constant time-step parameter $\Delta t$ to the pixel-dependent, and thus image content-dependent, scale $$\frac{\alpha}{k_{ij}}.$$

The resulting CDF for cleaning up the noisy input image is $$u_{ij} = \Sigma F_{ij} \otimes u_{ij}^o.$$

The notation $\otimes$ stands for component-wise matrix multiplication, and the notation $\Sigma$ indicates summation over all components or entries of the resulting matrix. Note that the iteration index k is no longer present. The 3×3 CDF may be represented by a matrix template $$F_{ij} = \frac{1}{k_{ij}} \begin{bmatrix} \frac{\mu C_{NW}^0}{h^2} & \frac{\alpha C_N^0}{h^2} & \frac{\mu C_{NE}^0}{h^2} \\ \frac{\alpha C_W^0}{h^2} & 1 & \frac{\alpha C_E^0}{h^2} \\ \frac{\mu C_{SW}^0}{h^2} & \frac{\alpha C_S^0}{h^2} & \frac{\mu C_{SE}^0}{h^2} \end{bmatrix},$$

where another image smoothing/sharpening parameter $\mu = \alpha \nu$ has been introduced (as mentioned previously, the parameter $\alpha$ may be coupled to the parameter $\mu$ resulting in a single free parameter for image smoothing/sharpening adjustment.) In an exemplary embodiment, $\mu = \alpha/4$. The CDF may also be written out explicitly as $$u_{ij} =$$
$$\frac{1}{k_{ij}}\left\{\left(\frac{\mu C_{NW}^0}{h^2}u_{i-1,j+1}^0 + \frac{\alpha C_N^0}{h^2}u_{i,j+1}^0 + \frac{\mu C_{NE}^0}{h^2}u_{i+1,j+1}^0\right) + \left(\frac{\alpha C_W^0}{h^2}u_{i-1,j}^0 + u_{ij}^0 + \frac{\alpha C_E^0}{h^2}u_{i+1,j}^0\right) + \left(\frac{\mu C_{SW}^0}{h^2}u_{i-1,j-1}^0 + \frac{\alpha C_S^0}{h^2}u_{i,j-1}^0 + \frac{\mu C_{SE}^0}{h^2}u_{i+1,j-1}^0\right)\right\}.$$

Note that the filter weights are a product of a magnitude of a difference between an adjacent pixel and the center pixel and a parameter ($\alpha$ or $\mu$), corresponding to the first set of neighboring pixels or the second set of neighboring pixels. Also note that the content-dependent scale value $k_{ij}$ is relative to the center pixel and ensures that the matrix $F_{ij}$ is normalized, such that a sum of the filter weights or elements is equal or approximately equal to a fixed value. The sum of the filter weights may vary slightly from the fixed value due to numerical processing artifacts and the like. The non-central elements in the CDF may determine smoothing of the input image.

Similarly, CDFs for 3×5, 5×5 and 7×7 windows may be determined or constructed. For the 3×5 window, the CDF may be formulated as

| $\lambda c_{i+1,j-2}/k_{i,j}$ | $\beta c_{i+1,j-1}/k_{i,j}$ | $\alpha c_{i+1,j}/k_{i,j}$ | $\beta c_{i+1,j+1}/k_{i,j}$ | $\lambda c_{i+1,j+2}/k_{i,j}$ |
|---|---|---|---|---|
| $\omega c_{i,j-2}/k_{i,j}$ | $\alpha c_{i,j-1}/k_{i,j}$ | $1/k_{i,j}$ | $\alpha c_{i,j+1}/k_{i,j}$ | $\omega c_{i,j+2}/k_{i,j}$ |
| $\lambda c_{i-1,j-2}/k_{i,j}$ | $\beta c_{i-1,j-1}/k_{i,j}$ | $\alpha c_{i-1,j}/k_{i,j}$ | $\beta c_{i-1,j+1}/k_{i,j}$ | $\lambda c_{i-1,j+2}/k_{i,j}$ |

Note that additional directions (NE-E, E-E, SE-E, SW-W, W-W, NW-W) have been taken into consideration by using the indices (i+2,j+1) . . . (i−2,j+1), and additional smoothing/sharpening parameters corresponding to additional sets of neighboring pixels have been included. The four parameters ($\alpha$, $\beta$, $\lambda$, $\omega$) used in this formulation of the CDF may be tied together to yield one or two independent parameters. Typical ratios include 1/2, 1/4, 3/4, 3/8, 5/8, 7/8, 1/16, 3/16, 5/16, 7/16, 9/16, 11/16, 13/16, 15/16, 1/32, 3/32, 5/32, 7/32, 9/32, 11/32, 13/32, 15/32, 17/32, 19/32, 21/32, 23/32, 25/32, 27/32, 29/32, and 31/32. For the 5×5 window, the CDF may be formulated as

| $\gamma c_{i-2,j+2}/k_{i,j}$ | $\lambda c_{i-1,j+2}/k_{i,j}$ | $\nu c_{i,j+2}/k_{i,j}$ | $\lambda c_{i+1,j+2}/k_{i,j}$ | $\gamma c_{i+2,j+2}/k_{i,j}$ |
|---|---|---|---|---|
| $\lambda c_{i-2,j+1}/k_{i,j}$ | $\beta c_{i-1,j+1}/k_{i,j}$ | $\alpha c_{i,j+1}/k_{i,j}$ | $\beta c_{i+1,j+1}/k_{i,j}$ | $\lambda c_{i+2,j+1}/k_{i,j}$ |
| $\nu c_{i-2,j}/k_{i,j}$ | $\alpha c_{i-1,j}/k_{i,j}$ | $1/k_{i,j}$ | $\alpha c_{i+1,j}/k_{i,j}$ | $\nu c_{i+2,j}/k_{i,j}$ |
| $\lambda c_{i-2,j-1}/k_{i,j}$ | $\beta c_{i-1,j-1}/k_{i,j}$ | $\alpha c_{i,j-1}/k_{i,j}$ | $\beta c_{i+1,j-1}/k_{i,j}$ | $\lambda c_{i+2,j-1}/k_{i,j}$ |
| $\gamma c_{i-2,j-2}/k_{i,j}$ | $\lambda c_{i-1,j-2}/k_{i,j}$ | $\nu c_{i,j-2}/k_{i,j}$ | $\lambda c_{i+1,j-2}/k_{i,j}$ | $\gamma c_{i+2,j-2}/k_{i,j}$ |

The five parameters ($\alpha$, $\beta$, $\lambda$, $\omega$, $\nu$) used in this formulation of the CDF may be tied together to yield one or two independent parameters. Typical ratios include 1/2, 1/4, 3/4, 3/8, 5/8, 7/8, 1/16, 3/16, 5/16, 7/16, 9/16, 11/16, 13/16, 15/16, 1/32, 3/32, 5/32, 7/32, 9/32, 11/32, 13/32, 15/32, 17/32, 19/32, 21/32, 23/32, 25/32, 27/32, 29/32, and 31/32. For the 7×7 window, the CDF may be formulated as

| $\sigma c_{i-3,j+3}/k_{i,j}$ | $\chi c_{i-2,j+3}/k_{i,j}$ | $\delta c_{i-1,j+3}/k_{i,j}$ | $\kappa c_{i,j+3}/k_{i,j}$ | $\delta c_{i+1,j+3}/k_{i,j}$ | $\chi c_{i+2,j+3}/k_{i,j}$ | $\sigma c_{i+3,j+3}/k_{i,j}$ |
|---|---|---|---|---|---|---|
| $\chi c_{i-3,j+2}/k_{i,j}$ | $\gamma c_{i-2,j+2}/k_{i,j}$ | $\lambda c_{i-1,j+2}/k_{i,j}$ | $\nu c_{i,j+2}/k_{i,j}$ | $\lambda c_{i+1,j+2}/k_{i,j}$ | $\gamma c_{i+2,j+2}/k_{i,j}$ | $\chi c_{i+3,j+2}/k_{i,j}$ |
| $\delta c_{i-3,j+1}/k_{i,j}$ | $\lambda c_{i-2,j+1}/k_{i,j}$ | $\beta c_{i-1,j+1}/k_{i,j}$ | $\alpha c_{i,j+1}/k_{i,j}$ | $\beta c_{i+1,j+1}/k_{i,j}$ | $\lambda c_{i+2,j+1}/k_{i,j}$ | $\delta c_{i+3,j+1}/k_{i,j}$ |
| $\kappa c_{i-3,j}/k_{i,j}$ | $\nu c_{i-2,j}/k_{i,j}$ | $\alpha c_{i-1,j}/k_{i,j}$ | $1/k_{i,j}$ | $\alpha c_{i+1,j}/k_{i,j}$ | $\nu c_{i+2,j}/k_{i,j}$ | $\kappa c_{i+3,j}/k_{i,j}$ |
| $\delta c_{i-3,j-1}/k_{i,j}$ | $\lambda c_{i-2,j-1}/k_{i,j}$ | $\beta c_{i-1,j-1}/k_{i,j}$ | $\alpha c_{i,j-1}/k_{i,j}$ | $\beta c_{i+1,j-1}/k_{i,j}$ | $\lambda c_{i+2,j-1}/k_{i,j}$ | $\delta c_{i+3,j-1}/k_{i,j}$ |
| $\chi c_{i-3,j-2}/k_{i,j}$ | $\gamma c_{i-2,j-2}/k_{i,j}$ | $\lambda c_{i-1,j-2}/k_{i,j}$ | $\nu c_{i,j-2}/k_{i,j}$ | $\lambda c_{i+1,j-2}/k_{i,j}$ | $\gamma c_{i+2,j-2}/k_{i,j}$ | $\chi c_{i+3,j-2}/k_{i,j}$ |
| $\sigma c_{i-3,j-3}/k_{i,j}$ | $\chi c_{i-2,j-3}/k_{i,j}$ | $\delta c_{i-1,j-3}/k_{i,j}$ | $\kappa c_{i,j-3}/k_{i,j}$ | $\delta c_{i+1,j-3}/k_{i,j}$ | $\chi c_{i+2,j-3}/k_{i,j}$ | $\sigma c_{i+3,j-3}/k_{i,j}$ |

The nine parameters ($\alpha$, $\beta$, $\lambda$, $\omega$, $\nu$, $\kappa$, $\delta$, $\chi$, $\gamma$) used in this formulation of the CDF may be tied together to yield one or two independent parameters. Typical ratios include 1/2, 1/4, 3/4, 3/8, 5/8, 7/8, 1/16, 3/16, 5/16, 7/16, 9/16, 11/16, 13/16, 15/16, 1/32, 3/32, 5/32, 7/32, 9/32, 11/32, 13/32, 15/32, 17/32, 19/32, 21/32, 23/32, 25/32, 27/32, 29/32, 31/32, 1/64, 3/64, 5/64, 7/64, 9/64, 11/64, 13/64, 15/64, 17/64, 19/64, 21/64, 23/64, 25/64, 27/64, 29/64, 31/64, 33/64, 35/64, 37/64, 39/64, 41/64, 43/64, 45/64, 47/64, 49/64, 51/64, 53/64, 55/64, 57/64, 59/64, 61/64, 63/64, and 65/64.

Figure 8:
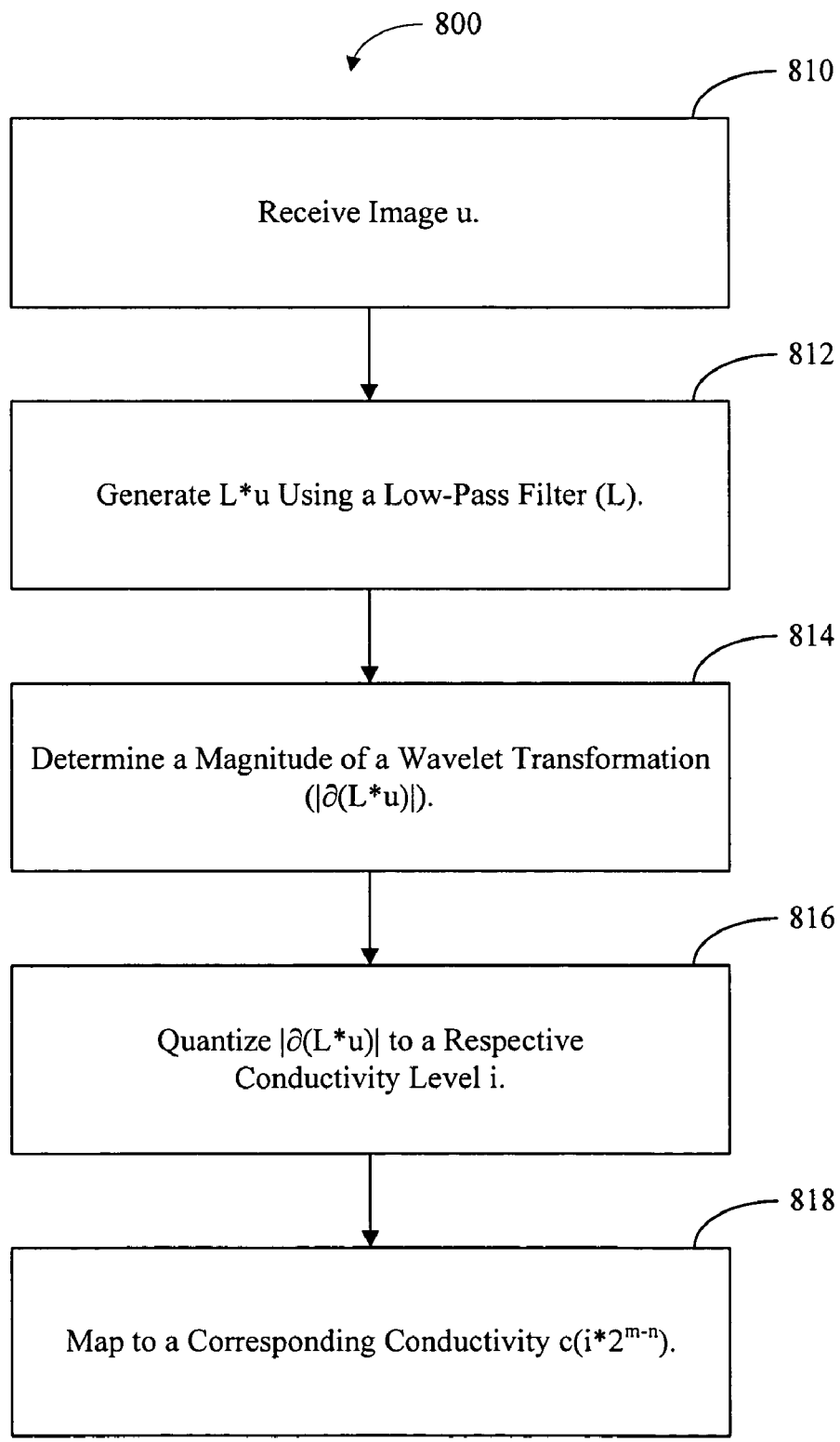
FIG. 8 is a flow diagram illustrating an embodiment of a process of determining a filter kernel.

Attention is now directed towards embodiments of the wavelet transformation. FIG. 8 is a flow diagram illustrating an embodiment 800 of a process of determining or constructing a filter kernel including the wavelet transformation described previously. An image u is received (810). A filtered image (L*u) is generated using a convolution of u with a low-pass filter L (812). In some embodiments, a weight sum of L in a horizontal direction and/or a vertical direction may have a finite value. A difference operation of (L*u) is a wavelet transform of u in the horizontal or vertical direction. If this wavelet transform is not applied in one of the two directions, then a first order difference operation may be used in this direction instead. In some embodiments, other wavelet transforms may be used. A magnitude of a wavelet transformation ($|\partial(L*u)|$), or a first-order difference, is determined (814). This value may be quantized to a respective conductivity level I (816). The wavelet transform (instead of the first-order difference operation) may be used with noisy input images. The results are mapped to a corresponding conductivity $c(i*2^{m-n})$ (818). The flow diagram 500 may include fewer operations or additional operations. In addition, two or more operations may be combined and/or the order of the operations may be changed.

As illustrated in FIG. 8, a noisy input image may be modified to yield discrete conductivity elements associated with the conductivity functions. In an exemplary embodiment, in place of the first order difference for the discrete gradient operation, the wavelet transformation may be implemented instead, for example, by applying a difference operation of a low-pass filtering of u in conjunction with a level/conductivity chart. In an exemplary embodiment, the spatial gradient of u in $c(|\nabla u|)$ may be replaced by some discrete spline-wavelet transform of u. For example, $\nabla u$ in $c(|\nabla u|)$ may be replaced by $\partial(L*u)=\equiv W$ u, where L is a low-pass filter associated with some desirable cardinal B-spline, the notation * stands for the standard convolution operation, and W u denotes a discrete wavelet transform operation. The operators L and W may be determined in respective (geographic) directions with respect to the center pixel of the noisy input image u. For example, $$W_E u_{i,j}=\partial_E(L*u)_{i,j}, \quad W_S u_{i,j}=\partial_S(L*u)_{i,j}, \quad W_W u_{i,j}=\partial_W(L*u)_{i,j},$$
$$W_N u_{i,j}=\partial_N(L*u)_{i,j}, \quad W_{NE} u_{i,j}=\partial_{NE}(L*u)_{i,j},$$
$$W_{SE} u_{i,j}=\partial_{SE}(L*u)_{i,j}, \quad W_{SW} u_{i,j}=\partial_{SW}(L*u)_{i,j},$$
$$W_{NW} u_{i,j}=\partial_{NW}(L*u)_{i,j}$$

In alternative embodiments, a Gaussian convolution may be used as the low-pass filter of u before the difference operation is applied to yield the desired discretization.

Table 1 illustrates an embodiment of a conductivity level/conductivity function chart, which associates the conductivity levels with values of the discrete conductivity elements. If an input image has r-bit gray-level for each channel (typically, r=8) and the conductivity level is quantized to s bits (s is less than or equal to r and typically ranges from 1 to 8), then the range of $p=|\nabla u|$ is the sequence $[0, \ldots, 2^r-1]$. If this sequence is quantized to $2^{r-s}[0, \ldots, 2^s-1]$, then the conductivity function c(p) maps $[0, \ldots, 2^s-1]$ to $[c(0), c(2^{r-s}), \ldots, c(2^{r-s}(2^s-1))]$. As discussed previously, typical examples of the conductivity functions include $c(p)=e^{-p/K}$, $c(p)=e^{-p^2/K^2}$, and $c(p)=K^2/(K^2+p^2)$, where K is a positive constant for all image pixels, or may be adapted according to neighboring pixel values (for adjustment of image smoothness/sharpness). In an exemplary embodiment of K as a global scalar, K may be 50. For many images, this number is larger than nearly 90% of the magnitudes of the gradient values in an image. The resulting chart may be used in a look-up procedure, as described further below with reference to FIGS. 13 and 14, where a noisy 1-bit image (with a single image edge separating the 0-bit "black" portion and the 1-bit "white" portion) is considered as input image, and the respective (center) pixel is a pixel on the image edge (FIG. 13) and not on the image edge (FIG. 14).

TABLE 1

A conductivity level/conductivity function chart.

| Level (i) | 0 | 1 | ... | $2^s - 1$ |
|---|---|---|---|---|
| conductivity $c(i * 2^{r-s})$ | $c(0)$ | $c(2^{r-s})$ | ... | $c(2^{r-s}(2^s - 1))$ |

Figure 9:
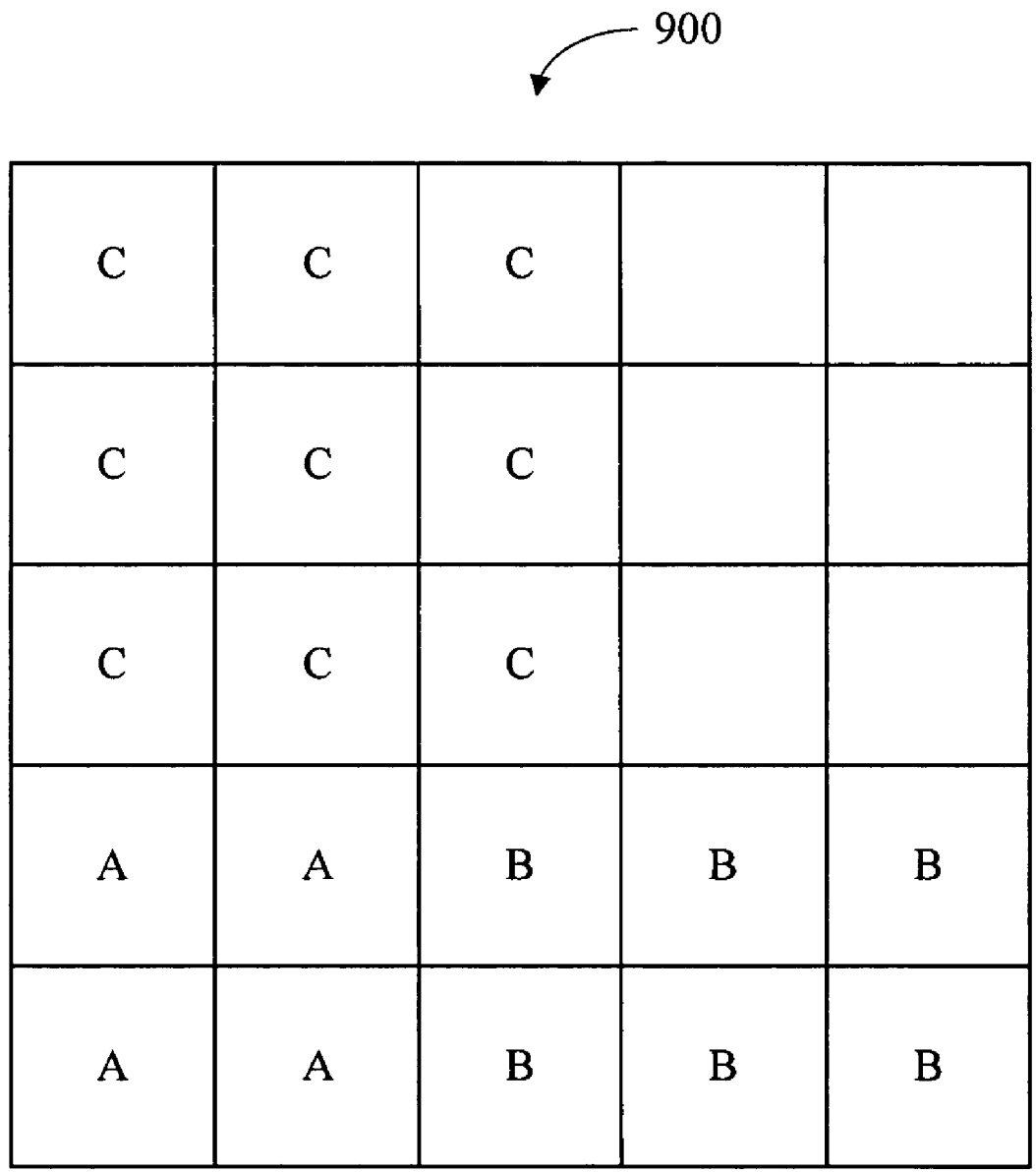
FIG. 9 is a block diagram illustrating a set of pixels in an image tile.
Figure 10:
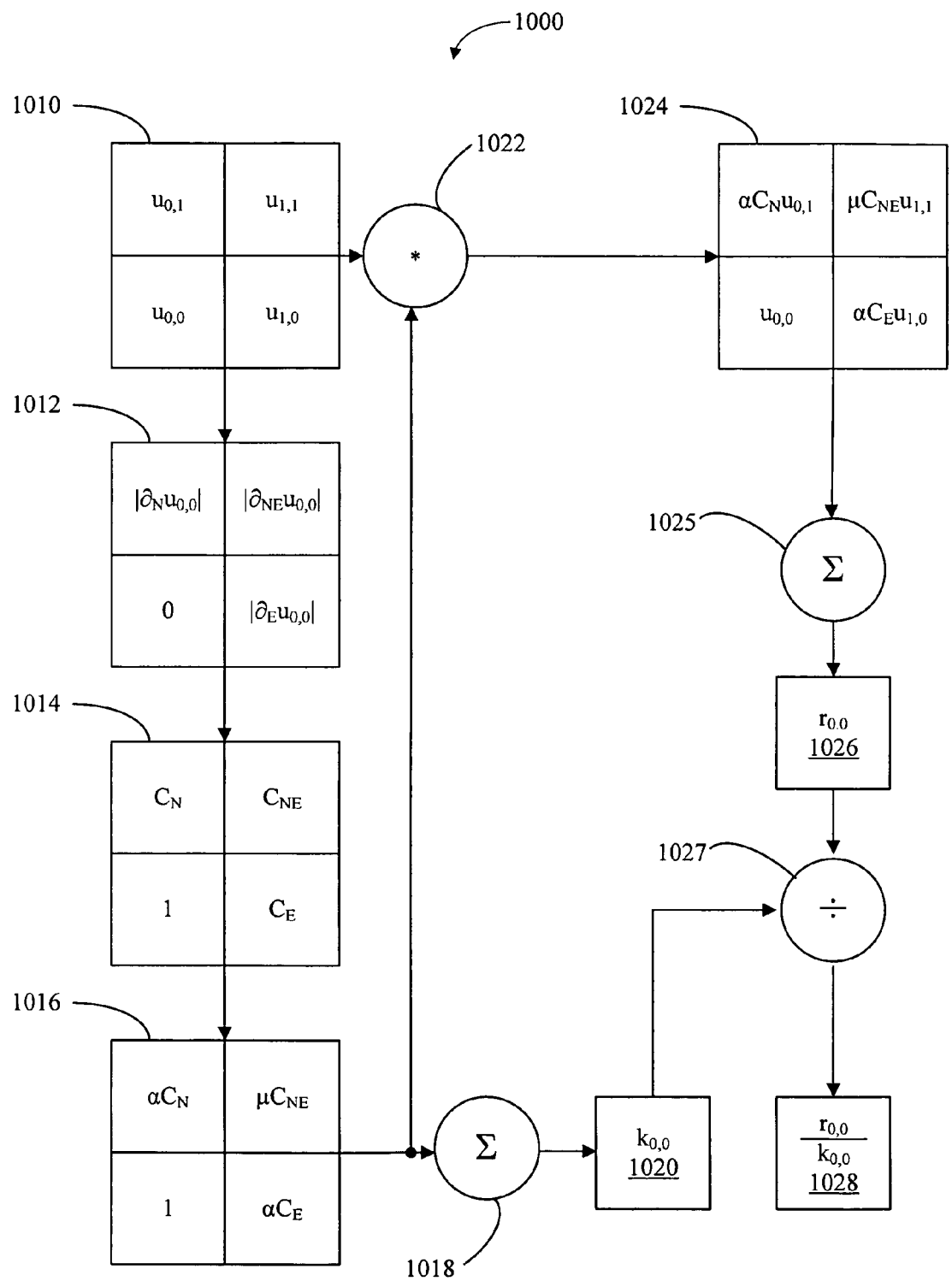
FIG. 10 is a flow diagram illustrating an embodiment of a process of constructing a filter kernel to a respective pixel at the corner of an image tile.
Figure 11:
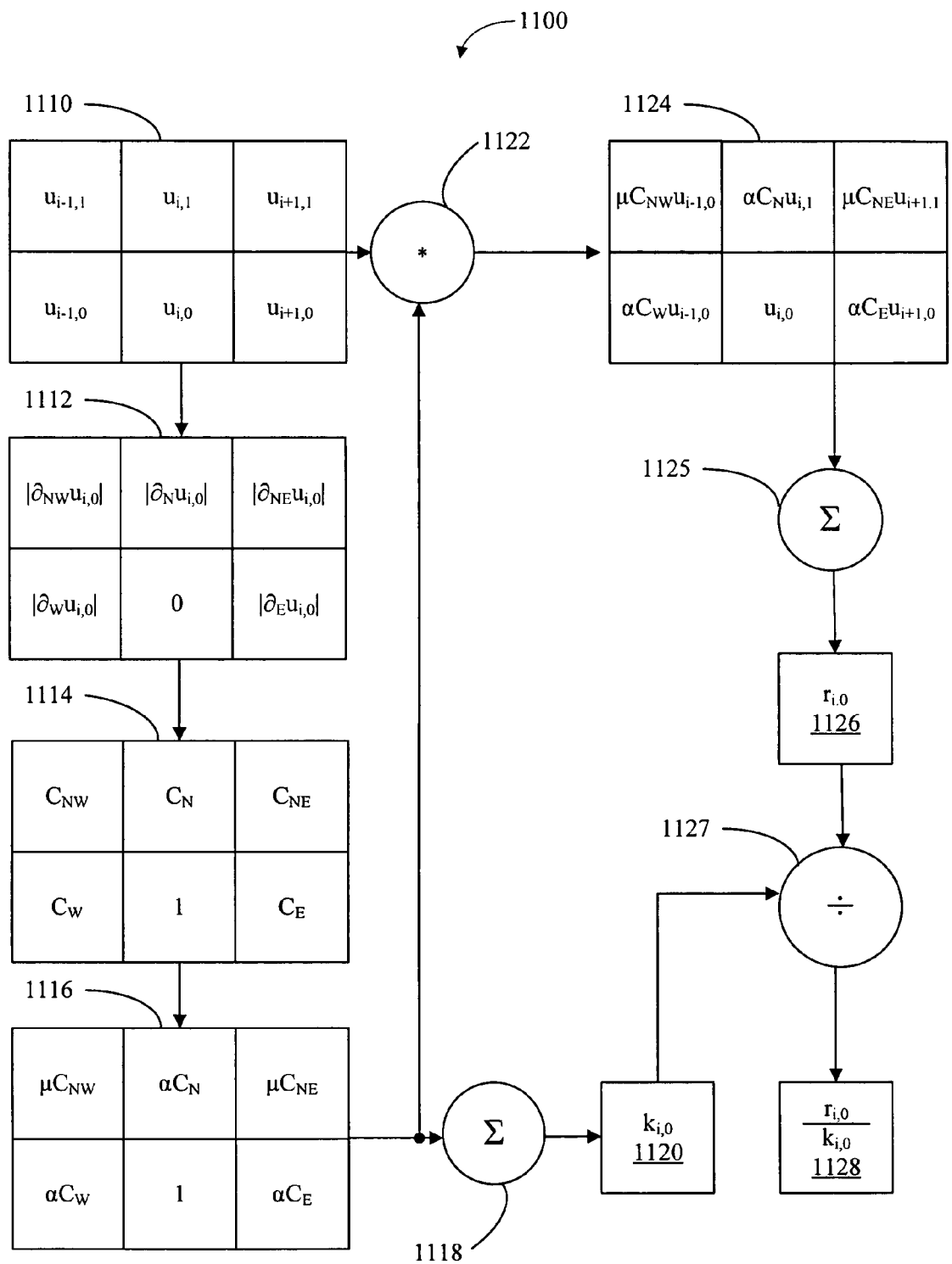
FIG. 11 is a flow diagram illustrating an embodiment of a process of constructing a filter kernel to a respective pixel on the boundary of an image tile.
Figure 12:
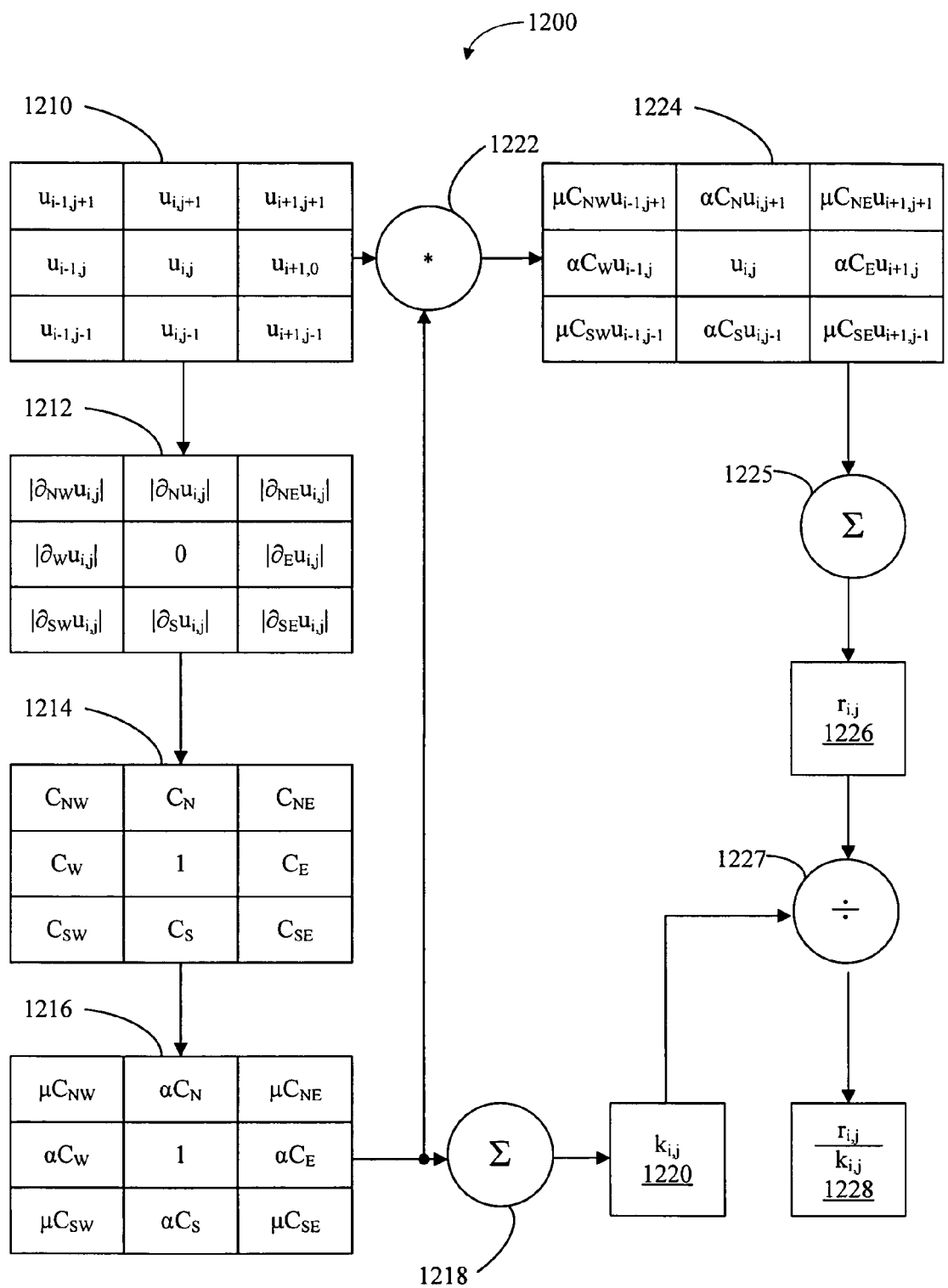
FIG. 12 is a flow diagram illustrating an embodiment of a process of constructing a filter kernel to a respective pixel in the interior of an image tile.

Attention is now directed towards additional embodiments that illustrate the determination or construction of the CDF and its use. FIG. 9 is a block diagram illustrating a set of pixels 900 in an image, image tile, or image block, such as a macroblock of a P or B frame (in video compression) of size 5×5. FIGS. 10, 11 and 12 illustrate the construction of corresponding 2-dimensional CDFs with up to a 3×3 window for sets of pixels labeled A, B and C, respectively, for removing or reducing noise in the 5×5 image tile. The set of pixels A in FIG. 9 illustrates the construction and application of a CDF for the corner pixel $u_{00}$ in FIG. 10. The set of pixels B in FIG. 9 illustrates the construction and application of a CDF for the boundary pixel $u_{i0}$ in FIG. 11. The set of pixels C in FIG. 9 illustrates the construction and application of a CDF for an interior center pixel $u_{i,j}$ in FIG. 12. For the set of pixels labeled A, the center pixel is a corner pixel in the set of pixels 900. Hence, it will be replaced with a value based on pixel values of 3 of its neighbors. For the set of pixels labeled B, the center pixel is a boundary pixel in the set of pixels 900 and will be replaced with a value based on pixel values of 5 of its neighbors. For the set of pixels labeled C, the center pixel is an interior pixel in the set of pixels 900 and will be replaced with a value based on pixel values of 8 of its neighbors.

FIG. 10 is a flow diagram illustrating an embodiment 1000 of a process of constructing a filter kernel for a CDF and applying the CDF to a corner pixel $u_{00}$. The first order difference operation is applied to a set of pixels 1010 to produce elements 1012 that are mapped using a level and conductivity chart (such as that shown in Table 1) to produce discrete conductivity elements 1014. Filter kernel 1016 is constructed by multiplying predefined subsets of the discrete conductivity elements 1014 with the smoothing and sharpening parameters α and μ. In an exemplary embodiments, a is approximately between 0.0625 and 1 and μ is approximately between 0 and 1. For example, α=0.25 and μ=0.0625. The elements 1016 are element-by-element multiplied 1022 with the set of pixels 1010 to produce elements 1024. Elements 1024 are summed (1025) to produce value $r_{0,0}$ 1026. Elements 1016 are also summed 1018 to produce a time-to-scale value $k_{0,0}$ 1020, sometimes called a normalization value. A ratio 1027 of the value $r_{0,0}$ and the time-to-scale value $k_{0,0}$ 1020 is a corresponding output filtered pixel value 1028.

FIG. 11 is a flow diagram illustrating an embodiment 1100 of a process of constructing a filter kernel for a CDF and applying the CDF to a boundary pixel $u_{i0}$. The first order difference operation is applied to a set of pixels 1110 to produce elements 1112 that are mapped using a level and conductivity chart (such as that shown in Table 1) to produce discrete conductivity elements 1114. Filter kernel 1116 is constructed by multiplying the predefined subsets of the discrete conductivity elements 1114 with the smoothing and sharpening parameters α and μ. The elements 1116 are element-by-element multiplied 1122 with the set of pixels 1110 to produce elements 1124. Elements 1124 are summed (1125) to produce value $r_{i,0}$ 1126. Elements 1116 are summed 1118 to produce time-to-scale value $k_{i,0}$ 1120, sometimes called a normalization value. A ratio 1127 of the value $r_{i,0}$ and the time-to-scale value $k_{i,0}$ 1120 is a corresponding output filtered pixel value 1128 that corresponds to the input pixel value $u_{i,0}$.

FIG. 12 is a flow diagram illustrating an embodiment 1200 of a process of constructing a filter kernel for a CDF and applying the CDF to an interior (center) pixel $u_{i,j}$. The first order difference operation is applied to a set of pixels 1210 to produce elements 1212 that are mapped using a level and conductivity chart (such as that shown in Table 1) to produce discrete conductivity elements 1214. Filter kernel 1216 is constructed by multiplying predefined subsets of the discrete conductivity elements 1214 with the smoothing and sharpening parameters α and μ. The elements of the filter kernel 1216 are element-by-element multiplied 1222 with the set of pixels 1210 to produce elements 1224. Elements 1224 are summed (1225) to produce value $r_{i,j}$ 1226. Elements 1216 are summed 1218 to produce time-to-scale value $k_{i,j}$ 1220. The ratio 1227 of the value $r_{i,j}$ 1226 and the time-to-scale value $k_{i,j}$ 1220 is computed to generate an output filtered pixel value 1228 ($r_{i,j}/k_{i,j}$) that corresponds to the input pixel value $u_{i,j}$.

Figure 13:
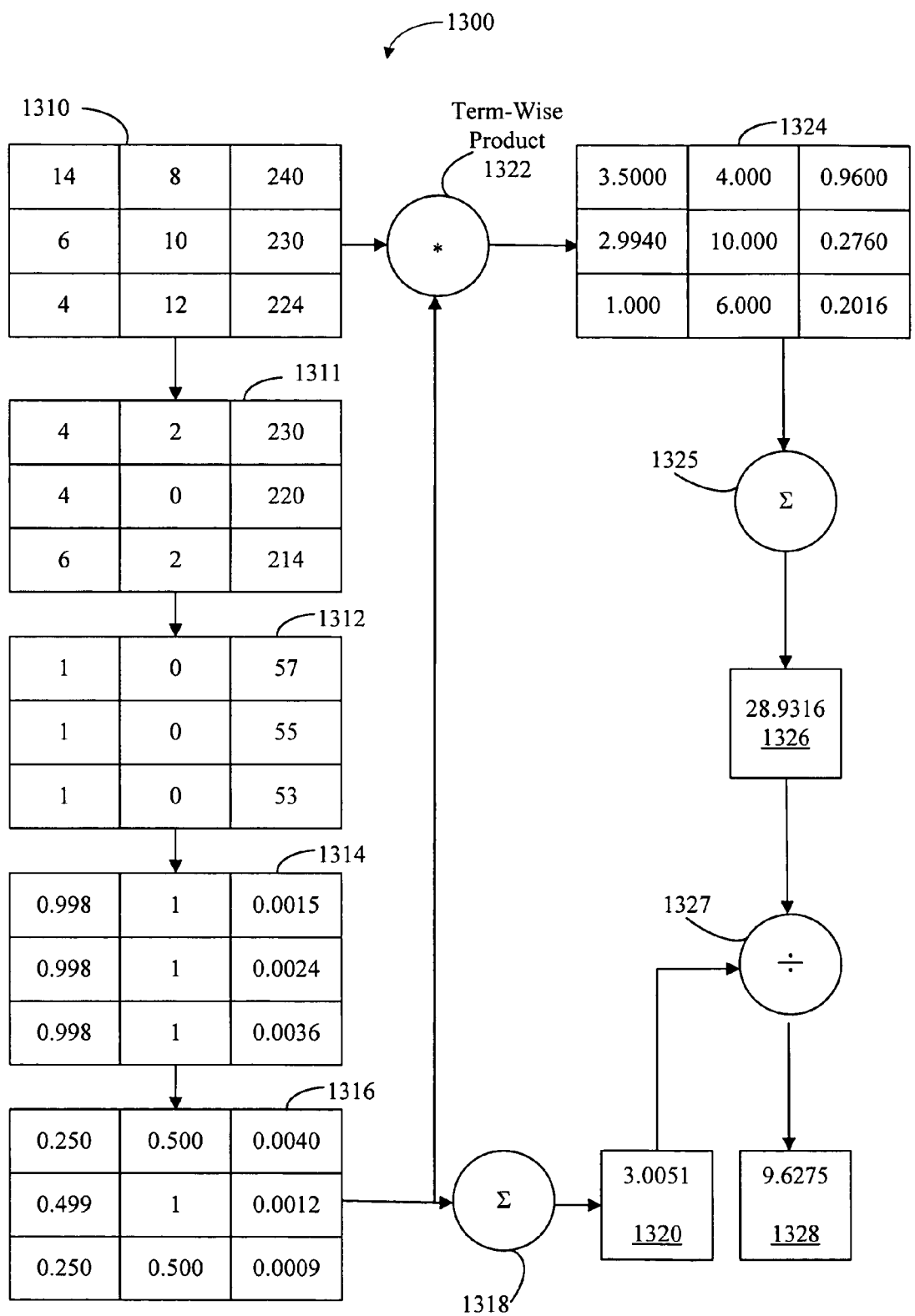
FIG. 13 is a flow diagram illustrating an embodiment of a process of constructing and using a filter kernel.
Figure 14:
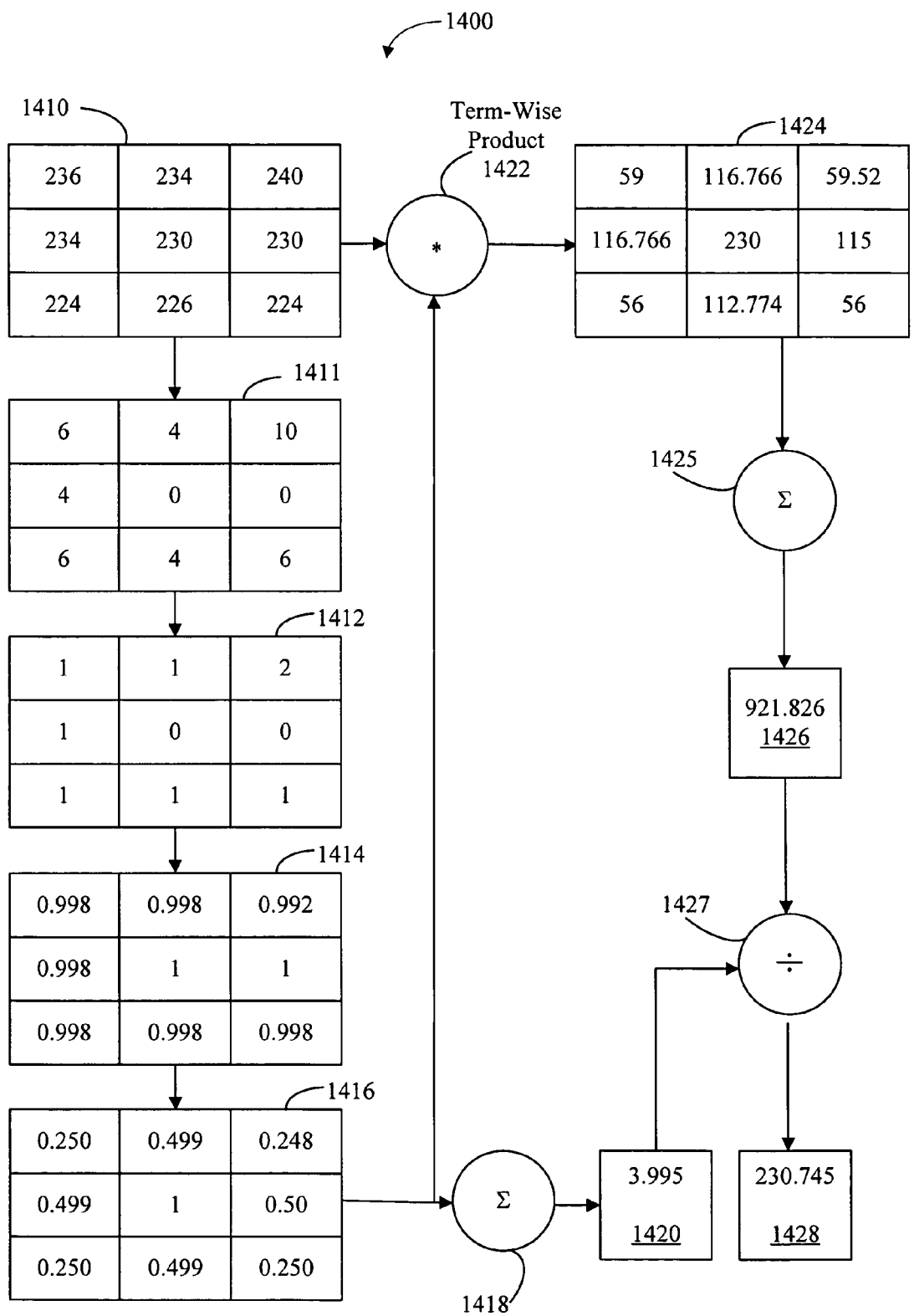
FIG. 14 is a flow diagram illustrating an embodiment of a process of constructing and using a filter kernel.

FIG. 13 is a flow diagram illustrating an embodiment 1300 of a process of constructing and using a filter kernel for a CDF. The first-order difference operation is applied to a set of pixels 1310 with a center pixel located on an image edge (within a image tile or array) to produce elements 1311. The set of pixels 1310 in this example represent a vertical edge between light and dark regions of an image. Elements 1311 are quantized to the corresponding conductivity level to produce discrete conductivity function values 1312, and mapped using a level and conductivity chart (such as that shown in Table 1) to produce elements 1314. Predefined subsets of elements 1314 are multiplied by smoothing and sharpening parameters α and β to produce filter kernel 1316. The set of pixels 1310 are element-by-element multiplied (1322) by the filter kernel 1316 to produce elements 1324. Elements 1324 are summed (1325) to produce value $r_{i,j}$=28.9316 (1326). The filter kernel elements 1316 are summed 1318 to produce time-to-scale value $k_{i,j}$=3.0051 (1320). The ratio 1327 of the value $r_{i,j}$ 1326 and the time-to-scale value $k_{i,j}$ 1320 is computed to generate an output filtered pixel value 1328 ($r_{i,j}/k_{i,j}$=9.6275) that corresponds to the input pixel value $u_{i,j}$. In this example, the filtered pixel 1328 may be quantized to a value of 10. In embodiment 1300, α=0.5, i=0.25, K=50 and the conductivity function is chosen to be $$c(p) = e^{\frac{-p^2}{2p_0^2}}.$$

FIG. 14 is a flow diagram illustrating an embodiment 1400 of a process of constructing and using a filter kernel for a CDF. The first-order difference operation is applied to a set of pixels 1410 with the center pixel not on an image edge to produce elements 1411, quantized to the corresponding conductivity levels to produce discrete conductivity function values 1412, and mapped using a level and conductivity chart (such as that shown in Table 1) to produce elements 1414. Predefined subsets of the elements 1414 are multiplied by smoothing and sharpening parameters α and μ and element-by-element (or term-wise) multiplied to produce filter kernel (CDF) 1416. Input image block 1410 with initial center pixel=230 is now element by element multiplied 1422 by the CDF 1416 to produce elements 1424. Elements 1424 are summed (1425) to produce value $r_{i,j}$ (921.826) 1426, and the elements of CDF 1416 are summed 1418 to produce time-to-scale value $k_{i,j}$ (3.995) 1420. The ratio 1427 of the value $r_{i,j}$ 1426 and the time-to-scale value $k_{ij}$ 1420 is computed to generate an output filtered pixel value (230.745) 1428 that corresponds to the input pixel value $u_{i,j}$. The filtered pixel 1428 may be quantized to a value of 231. In embodiment 1400, α=0.5, μ=0.25, K=50 and the conductivity function is chosen to be $$c(p) = e^{\frac{-p^2}{2p_0^2}}.$$

The CDF may be used as a pre-coder for removing or reducing noise in an image, which may be an I-frame of a video sequence. For example, in embodiment 1500 in FIG. 5 an 8×8 tile 1512 of an image or I-frame is processed by a CDF 1514. The filtered image tile of the image or I-frame 1516 is sent to encoder 1518. The encoder 1518 includes a discrete cosine transformation (DCT) 1520, quantization 1522, and entropy coding 1524. An encoded bit stream 1526 with a smaller bit-rate is output. The flow diagram 1500 may include fewer operations or additional operations. In addition, two or more operations may be combined and/or the order of the operations may be changed.

Figure 15:
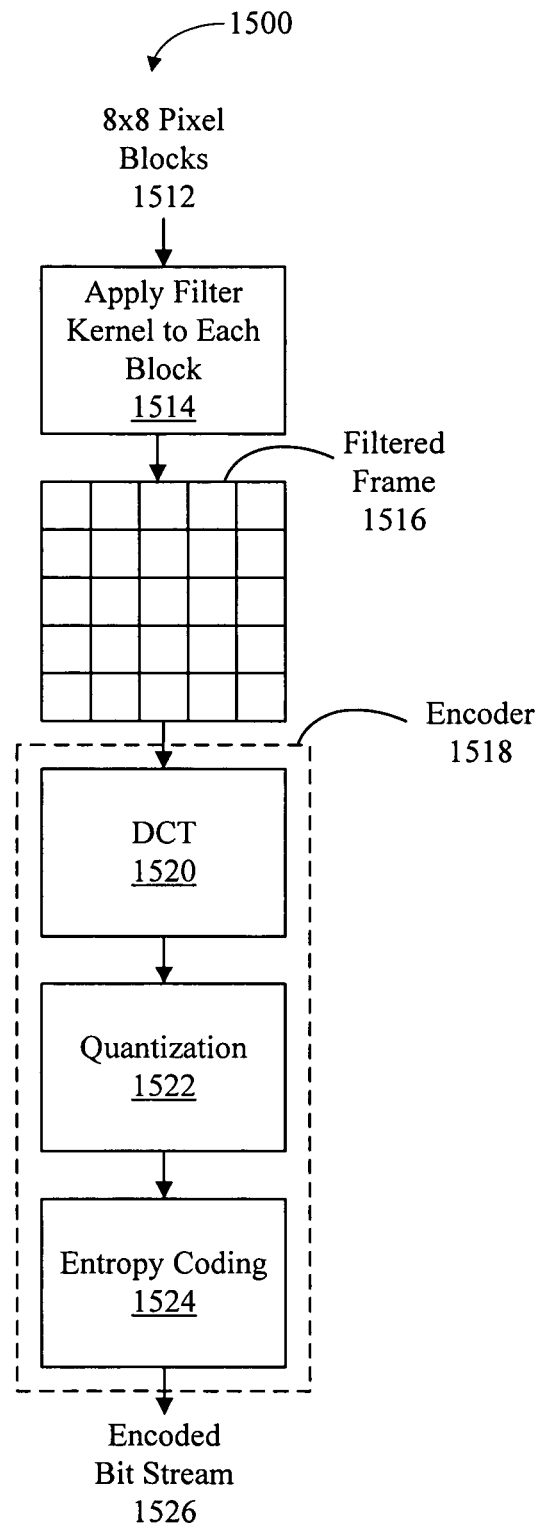
FIG. 15 is a flow diagram illustrating an embodiment of a process of filtering a digital image.
Figure 16:
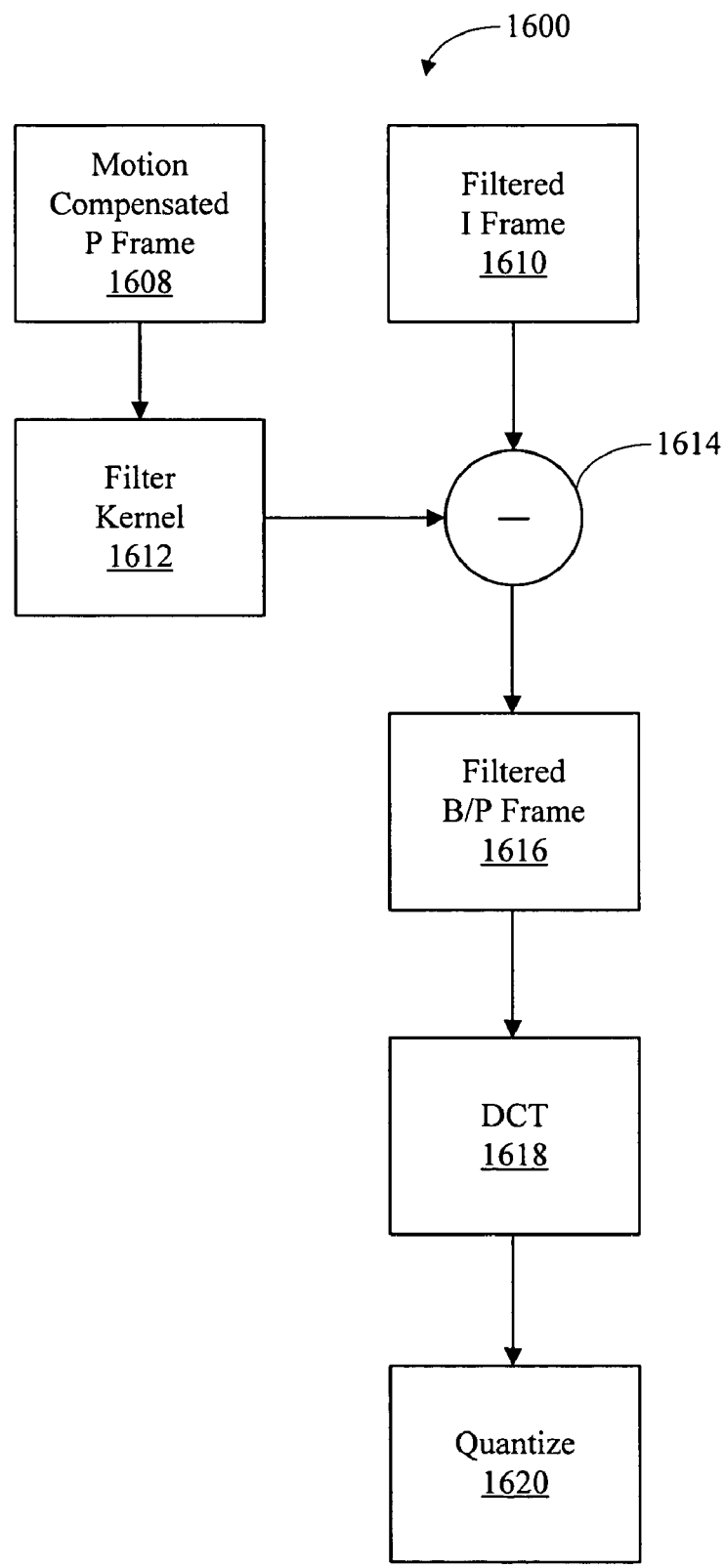
FIG. 16 is a block diagram illustrating an embodiment of a process of filtering a P or B frame for or during video compression.

A respective CDF may be integrated as a pre-coder in an existing encoder, such as MJPEG, MPEG-1, 2 4, 7 and H263, AVC or H264. Filtered images generated using the respective CDF or a set of CDFs may be compatible with existing decoders. The respective filter kernel for a CDF may be used to clean up I frames, P frames, and/or macro-blocks in motion estimation-compensation. FIG. 16 is a block diagram illustrating an embodiment 1600 of such a process. A filter kernel 1612 is applied to a motion-compensated P frame 1608 and subtracted 1614 from a filtered I frame 1610 (which was illustrated in FIG. 15). A DCT 1618 and quantization 1620 are applied to a resulting filtered B/P frame 1616.

Figure 17:
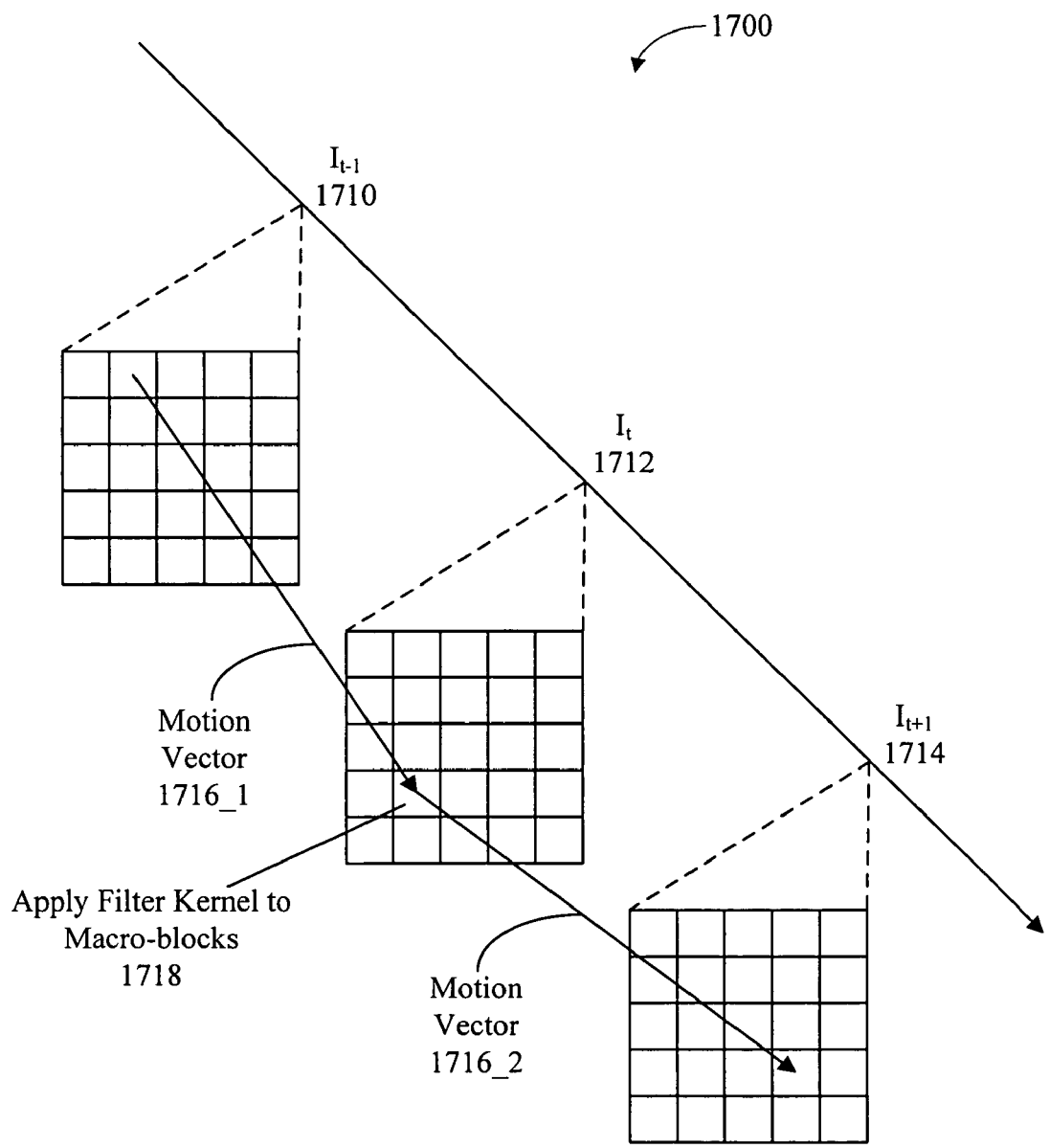
FIG. 17 is a block diagram illustrating an embodiment of a process of filtering a macro-block for or during video compression.

FIG. 17 is a block diagram illustrating an embodiment 1700 of a process of filtering 1718 a digital image or image tile, such as a frame 1712, and in particular, for filtering 1718 16×16 macro-blocks for motion compensation. In some embodiments, a previous I or P frame 1710 is used to determine a motion vector 1716_1 and/or a subsequent P or B frame 1714 is used to determine a motion vector 1716_2. The former may occur if the frame 1712 is a P frame and the latter may occur if the frame 1712 is a B frame.

Figure 18:
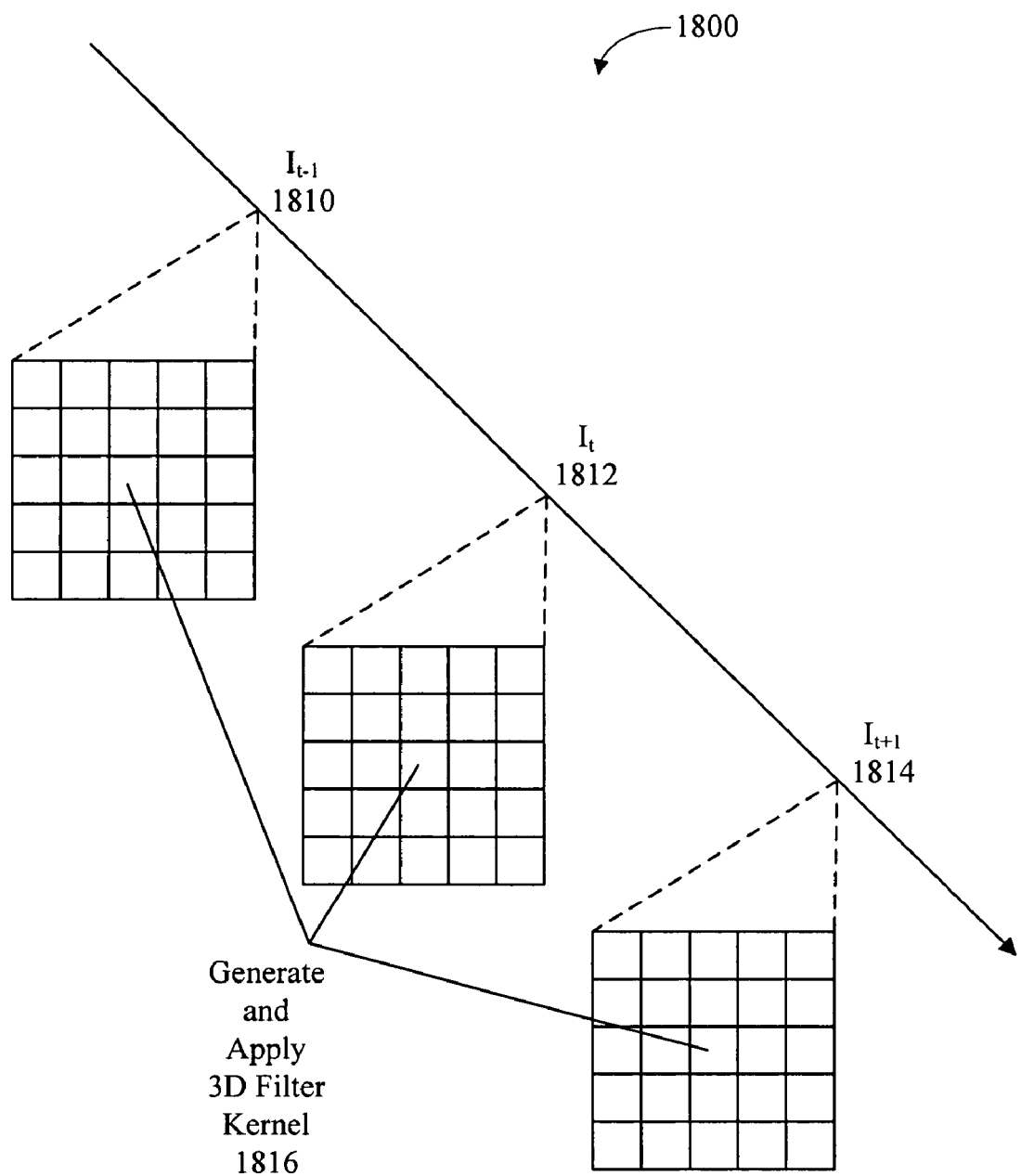
FIG. 18 is a block diagram illustrating an embodiment of a process of filtering a three-dimensional digital image.

FIG. 18 is a flow diagram illustrating an embodiment of a process 1800 of filtering or pre-coding a three-dimensional digital image called an image cube. In process 1800, a 3-dimensional CDF is generated and applied 1816 to reduce or eliminate noise from image cubes, such cubes based on three consecutive video frames 1810, 1812, 1814, after motion estimation and compensation have been applied to the P-frames and B-frames (which was illustrated in FIG. 17) to create video frames 1810, 1812, and 1814. In some embodiments, such as MJEP, video frames 1810, 1812, and 1814 are I frames. In some embodiments, the filter kernels for CDFs may be applied to a mixture of I, P, and/or B frames that constitute an image cube.

Figure 19:
FIG. 19 is a block diagram illustrating embodiments of unfiltered and filtered digital images.
Figure 19:
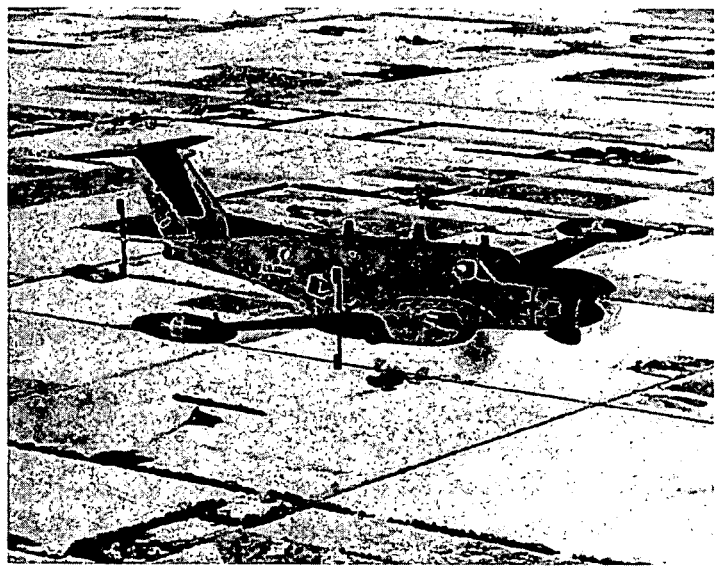

The filter kernel for a CDF may be applied to one or more images, or one or more subsets of one or more images, to reduce or eliminate noise while leaving image content, such as texture and/or spatial frequencies associated with image edges, approximately unchanged. This is illustrated in FIG. 19, which shows an unfiltered digital image and a filtered digital image generated using an embodiment of the present invention.

The foregoing descriptions of specific embodiments of the present invention are presented for purposes of illustration and description. They are not intended to be exhaustive or to limit the invention to the precise forms disclosed. Rather, it should be appreciated that many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method of filtering a digital image, comprising
in a device having one or more processors and memory storing one or more programs to be executed by the one or more processors:
for each respective pixel in a set of pixels of the digital image, generating a pixel-dependent filter kernel for the respective pixel, and applying the filter kernel to the respective pixel to smooth noise and preserve spatial frequencies associated with image edges in the digital image in accordance with a first filtering parameter,
wherein the filter kernel is a closed-form function of the respective pixel, the closed-form function including contributions from a first set of neighboring pixels, wherein the contribution from each respective neighboring pixel in the first set of neighboring pixels is determined at least in part by a conductivity function evaluated in accordance with a difference in intensity between the respective pixel and the respective neighbor pixel, the conductivity function mapping quantized input values to a finite number of predefined conductivity function values, and
wherein the filter kernel for each respective pixel in the set of pixels has a content-dependent normalization specific to the respective pixel such that a sum of values of elements in the filter kernel equals a substantially fixed value.

2. The method of claim 1, wherein the applying comprises a single pass for the respective pixel.

3. The method of claim 1, wherein the content-dependent normalization of the filter kernel includes a content-dependent scale value for the respective pixel,
the method further including generating the content-dependent scale value in accordance with a time-to-scale transformation for the respective pixel.

4. The method of claim 1, wherein applying the filter kernel to each respective pixel in the set of pixels leaves the filtered digital image substantially unchanged.

5. The method of claim 1, wherein the first filtering parameter determines a boundary between smoothing and sharpening.

6. The method of claim 1, wherein the first filtering parameter substantially maintains texture information in the digital image by reducing smoothing of noise at a position in the digital image containing spatial frequencies greater than a threshold.

7. The method of claim 1, wherein non-central elements in the filter kernel for the respective pixel comprise values of a discretization of an anisotropic diffusion equation determined based on magnitudes of differences between pixels in the first set of neighboring pixels and the respective pixel, a central pixel in the filter kernel corresponds to the respective pixel, and wherein the first filtering parameter maps a time step in the discretization of the anisotropic diffusion equation to a content-dependent scale.

8. The method of claim 7, wherein a conductivity in the discretization of the anisotropic diffusion equation is a function of a wavelet transformation.

9. The method of claim 8, wherein the wavelet transformation is implemented as a look-up table.

10. The method of claim 1, further comprising modifying a color of the pixel using the filter kernel.

11. The method of claim 10, wherein modifying the color includes a color component.

12. The method of claim 1, wherein the filter kernel includes contributions from a second set of neighboring pixels and is farther in accordance with a second filtering parameter.

13. The method of claim 1, wherein the filter kernel corresponds to a window of size 2m+1 by 2n+1 and includes the first set of neighboring pixels.

14. The method of claim 13, wherein m is equal to n.

15. The method of claim 13, wherein m and n for the respective pixel are selected from a set consisting of positive integers between 1 and 50.

16. The method of claim 13, wherein m and n for the filter kernel are a function of a pixel size and image resolution.

17. The method of claim 1, wherein the digital image comprises video data.

18. The method of claim 1, wherein the applying is performed for each pixel in the set of pixels to produce a pre-coded digital image, the method further comprising compressing the pre-coded digital image in accordance with a predefined image compression methodology.

19. A method of filtering a digital image, comprising:
in a device having one or more processors and memory storing one or more programs to be executed by the one or more processors:
applying a respective pixel-dependent filter kernel to each respective pixel in a set of pixels to smooth noise and preserve spatial frequencies associated with image edges in the digital image in accordance with a filtering parameter to produce a filtered pixel,
wherein the filter kernel is a closed-form function of the respective pixel, the closed-form function including contributions from a first set of neighboring pixels, wherein the contribution from each respective neighboring pixel in the first set of neighboring pixels is determined at least in part by a conductivity function evaluated in accordance with a difference in intensity between the respective pixel and the respective neighbor pixel, the conductivity function mapping quantized input values to a finite number of predefined conductivity function values, and
wherein the filtered pixel corresponds to $$\sum_{m,n} \frac{1}{\gamma} M \otimes U,$$

M is a closed-form array that is a function of the respective pixel and has a window size of 2m+1 by 2n+1, where m and n are positive integers, and wherein M includes contributions from a set of neighboring pixels in the window, U is a sub-array in the set of pixels and includes the respective pixel and the set of neighboring pixels, $\otimes$ indicates element-by-element multiplication of elements in M and elements in U, and $\gamma$ is a content-dependent normalization factor specific to the respective pixel such that a sum of value of elements in the array $$\frac{1}{\gamma} M$$

equals a substantially fixed value.

20. A digital image processor, comprising:
memory;
a processor; and
one or more programs stored in the memory and configured to be executed by the processor, the one or more programs including:
instructions for generating, for each respective pixel in a set of pixels of the digital image, a pixel-dependent filter kernel for the respective pixel, and for applying the filter kernel to the respective pixel to smooth noise and preserve spatial frequencies associated with image edges in the digital image in accordance with a filtering parameter,
wherein the filter kernel is a closed-form function of the respective pixel, the closed-form function including contributions from a first set of neighboring pixels, wherein the contribution from each respective neighboring pixel in the first set of neighboring pixels is determined at least in part by a conductivity function evaluated in accordance with a difference in intensity between the respective pixel and the respective neighbor pixel, the conductivity function mapping quantized input values to a finite number of predefined conductivity function values, and
wherein the filter kernel for each respective pixel in the set of pixels has a content-dependent normalization specific to the respective pixel such that a sum of values of elements in the filter kernel equals a substantially fixed value.

21. A computer-program product for filtering a digital image, comprising:
a computer readable storage medium and a computer program mechanism embedded therein, the computer program mechanism comprising:
instructions for generating, for each respective pixel in a set of pixels of the digital image, a pixel-dependent filter kernel for the respective pixel, and for applying the filter kernel to the respective pixel to smooth noise and preserve spatial frequencies associated with image edges in the digital image in accordance with a filtering parameter, wherein the filter kernel is a closed-form function of the respective pixel the closed-form function including contributions from a first set of neighboring pixels, wherein the contribution from each respective neighboring pixel in the first set of neighboring pixels is determined at least in part by a conductivity function evaluated in accordance with a difference in intensity between the respective pixel and the respective neighbor pixel, the conductivity function mapping quantized input values to a finite number of predefined conductivity function values, and
wherein the filter kernel for each respective pixel in the set of pixels has a content-dependent normalization specific to the respective pixel such that a sum of values of elements in the filter kernel equals a substantially fixed value.

22. A digital image processor, comprising:
memory means;
processor means; and
a program mechanism, wherein the program mechanism is stored in the memory means and configured to be executed by the processor means, the program mechanism including:
instructions for generating, for each respective pixel in a set of pixels of the digital image, a pixel-dependent filter kernel for the respective pixel, and for applying the filter kernel to the respective pixel to smooth noise and preserve spatial frequencies associated with image edges in the digital image in accordance with a filtering parameter,
wherein the filter kernel is a closed-form function of the respective pixel the closed-form function including contributions from a first set of neighboring pixels, wherein the contribution from each respective neighboring pixel in the first set of neighboring pixels is determined at least in part by a conductivity function evaluated in accordance with a difference in intensity between the respective pixel and the respective neighbor pixel, the conductivity function mapping quantized input values to a finite number of predefined conductivity function values, and
wherein the filter kernel for each respective pixel in the set of pixels has a content-dependent normalization specific to the respective pixel such that a sum of values of elements in the filter kernel equals a substantially fixed value.

23. The digital image processor of claim 20,
wherein the content-dependent normalization of the filter kernel includes a content-dependent scale value for the respective pixel, and the one or more programs further including instructions for generating the content-dependent scale value in accordance with a time-to-scale transformation for the respective pixel.

24. The computer program product of claim 21,
wherein the content-dependent normalization of the filter kernel includes a content-dependent scale value for the respective pixel, and the computer program mechanism further comprising instructions for generating the content-dependent scale value in accordance with a time-to-scale transformation for the respective pixel.

25. The method of claim 1, wherein
the respective pixel is in a respective video frame of a sequence of video frames,
the set of neighboring pixels includes:
one or more corresponding pixels, corresponding to the respective pixel, in a video frame before the respective video frame in the sequence, and
one or more corresponding pixels, corresponding to the respective pixel, in a video frame after the respective video frame; and
the conductivity function is a three dimensional conductivity function.

26. The digital image processor of claim 20, wherein
the respective pixel is in a respective video frame of a sequence of video frames,
the set of neighboring pixels includes:
one or more corresponding pixels, corresponding to the respective pixel, in a video frame before the respective video frame in the sequence, and
one or more corresponding pixels, corresponding to the respective pixel, in a video frame after the respective video frame; and
the conductivity function is a three dimensional conductivity function.

27. The computer program product of claim 21, wherein
the respective pixel is in a respective video frame of a sequence of video frames,
the set of neighboring pixels includes:
one or more corresponding pixels, corresponding to the respective pixel, in a video frame before the respective video frame in the sequence, and
one or more corresponding pixels, corresponding to the respective pixel, in a video frame after the respective video frame; and
the conductivity function is a three dimensional conductivity function.

* * * * *

UNITED STATES PATENT AND TRADEMARK OFFICE
CERTIFICATE OF CORRECTION

| | | |
|---|---|---|
| PATENT NO. | : 7,570,832 B2 | Page 1 of 1 |
| APPLICATION NO. | : 11/153461 | |
| DATED | : August 4, 2009 | |
| INVENTOR(S) | : Chui et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 847 days.

Signed and Sealed this

Seventh Day of September, 2010

David J. Kappos
*Director of the United States Patent and Trademark Office*